(12) United States Patent
Kang et al.

(10) Patent No.: US 7,952,817 B2
(45) Date of Patent: May 31, 2011

(54) PROJECTION LENS

(75) Inventors: Yi-Hao Kang, Hsin-Chu (TW);
Kuo-Chuan Wang, Hsin-Chu (TW);
Yuan-Hung Su, Hsin-Chu (TW)

(73) Assignee: Young Optics Inc., Hsin-Chu (TW)

( * ) Notice: Subject to any disclaimer, the term of this patent is extended or adjusted under 35 U.S.C. 154(b) by 15 days.

(21) Appl. No.: 12/509,480

(22) Filed: Jul. 26, 2009

(65) Prior Publication Data
US 2010/0039711 A1 Feb. 18, 2010

Related U.S. Application Data

(60) Provisional application No. 61/087,208, filed on Aug. 8, 2008.

(51) Int. Cl.
*G02B 13/04* (2006.01)
*G02B 15/14* (2006.01)

(52) U.S. Cl. ........................ 359/749; 359/680

(58) Field of Classification Search .......... 359/680–682, 359/749–753, 649–657, 716
See application file for complete search history.

(56) References Cited

U.S. PATENT DOCUMENTS

| | | | |
|---|---|---|---|
| 3,737,214 A * | 6/1973 | Shimizu | 359/749 |
| 6,542,316 B2 | 4/2003 | Yoneyama | |
| 6,560,041 B2 | 5/2003 | Ikeda et al. | |
| 6,621,645 B2 | 9/2003 | Sato | |
| 6,999,247 B2 | 2/2006 | Kim | |
| 7,123,426 B2 | 10/2006 | Lu et al. | |
| 7,126,767 B2 | 10/2006 | Lu | |
| 7,173,777 B1 | 2/2007 | Lu et al. | |
| 7,184,219 B2 | 2/2007 | Kobayashi | |
| 7,423,819 B1 * | 9/2008 | Chuang et al. | 359/753 |
| 2002/0005994 A1 * | 1/2002 | Shikama | 359/749 |
| 2006/0176577 A1 * | 8/2006 | Kobayashi | 359/680 |
| 2008/0304165 A1 * | 12/2008 | Kang et al. | 359/716 |

* cited by examiner

*Primary Examiner* — Joseph Martinez
*Assistant Examiner* — James R Greece
(74) *Attorney, Agent, or Firm* — Chun-Ming Shih

(57) ABSTRACT

A projection lens includes a first lens group with a negative refractive power, a second lens group with a negative refractive power, and a third lens group with a positive refractive power, wherein the second lens group is disposed between the first lens group and the third lens group. The first lens group includes an aspheric lens. The second lens group includes a first lens and a second lens. The third lens group includes a third lens, a forth lens, a fifth lens, a sixth lens, a seventh lens, an eighth lens, a ninth lens, a tenth lens, an eleventh lens, and a twelfth lens.

8 Claims, 25 Drawing Sheets

PROJECTION LENS

This application is based upon and claims the benefit of priority from the prior U.S. Provisional Application No. 61/087,208, filed Aug. 8, 2008, the prior Taiwanese Patent Application No. 097148089, filed Dec. 10, 2008, and the prior Taiwanese Patent Application No. 098110536, filed Mar. 30, 2009, the entire contents of which are incorporated herein by reference.

BACKGROUND

1. Field of the Invention

The invention relates to a lens, and particularly to a projection lens.

2. Description of the Related Art

A projection lens adapted to a projection apparatus may have high imaging quality. In general, a frame projected by the projection lens may satisfy multiple conditions such as low distortion aberration, high resolution, high contrast, and high uniformity, etc. Furthermore, for reducing a projection distance, the projection lens may have a wide viewing angle.

It needs to overcome multiple difficulties to design a projection lens which satisfies the above-mentioned conditions. For example, the distortion aberration is usually increased with the widening of the viewing angle, and this makes it difficult to correct the distortion aberration. Furthermore, for correcting the distortion aberration, more lenses may be used, and a length of the projection lens and a cost of the projection lens are increased.

In view of the above, it is important to design a projection lens having advantages of high imaging quality, wide viewing angle, compact size, and low cost.

BRIEF SUMMARY

The invention relates to a projection lens having an advantage of low cost.

To achieve at least of the above-mentioned advantages, an embodiment of the invention provides a projection lens including a first lens group, a second lens group, and a third lens group arranged in sequence. The second lens group is disposed between the first lens group and the third lens group, and refractive powers of the first lens group, the second lens group, and the third lens group are negative, negative, and positive, respectively. Moreover, the first lens group includes an aspheric lens having a negative refractive power. The second lens group includes a first lens and a second lens. The first lens is disposed between the aspheric lens and the second lens, and refractive powers of the first lens and the second lens are negative. The third lens group includes a third lens, a forth lens, a fifth lens, a sixth lens, a seventh lens, an eighth lens, a ninth lens, a tenth lens, an eleventh lens, and a twelfth lens arranged in sequence, wherein the third lens is disposed between the second lens and the forth lens. Refractive powers of the third lens, the forth lens, the fifth lens, the sixth lens, the seventh lens, the eighth lens, the ninth lens, the tenth lens, the eleventh lens, and the twelfth lens are positive, negative, positive, negative, negative, positive, negative, positive, negative, and positive, respectively.

In the projection lens of the embodiment of the invention, the first lens group and the second lens group may be used to effectively correct a distortion, and the third lens group may be used to effectively eliminate field curvature, astigmatism, spherical aberration, and chromatic aberration. Therefore, the projection lens of the embodiment of the invention may achieve advantages of wide viewing angle and high imaging quality. Furthermore, the number of the lenses used in the projection lens of the embodiment of the invention is relatively small, so that a size and a cost of the projection lens may be reduced.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
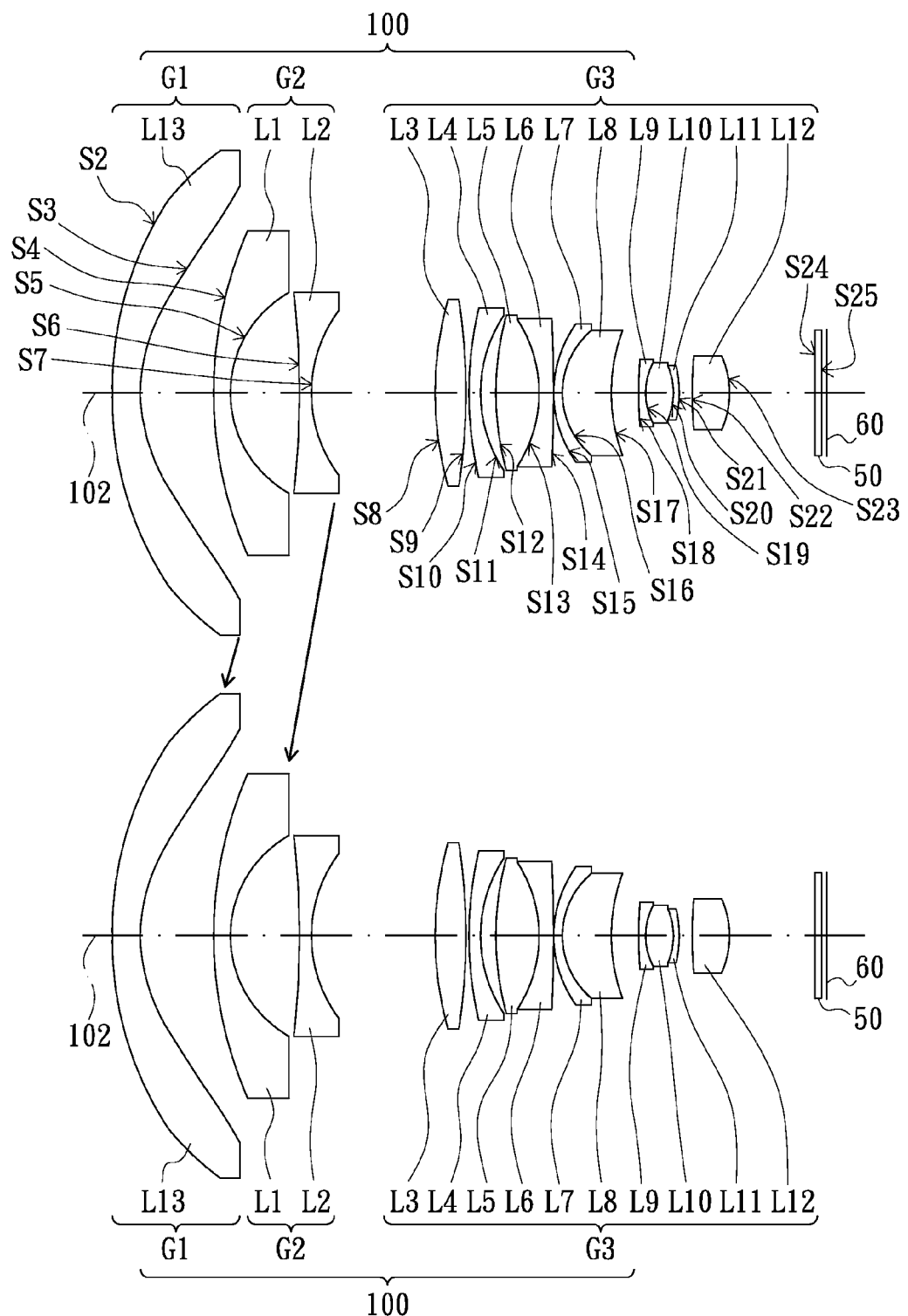
FIG. 1 is a schematic view of a projection lens according to an embodiment of the invention.

FIG. 1 is a schematic view of a projection lens according to an embodiment of the invention. Referring to FIG. 1, the projection lens 100 of the embodiment includes a first lens group G1, a second lens group G2, and a third lens group G3 arranged in sequence, wherein the second lens group G2 is disposed between the first lens group G1 and the third lens group G3, and the third lens group G3 is adjacent to a light valve 60. The light valve 60 may be, but not limited to, a digital micro-mirror device (DMD). Refractive powers of the first lens group G1, the second lens group G2, and the third lens group G3 are negative, negative, and positive, respectively. Moreover, the first lens group G1 includes an aspheric lens L13 having a negative refractive power. The second lens group G2 includes a first lens L1 and a second lens L2. The first lens L1 is disposed between the aspheric lens L13 and the second lens L2, and refractive powers of the first lens L1 and the second lens L2 are negative. The third lens group G3 includes a third lens L3, a forth lens L4, a fifth lens L5, a sixth lens L6, a seventh lens L7, an eighth lens L8, a ninth lens L9, a tenth lens L10, an eleventh lens L11, and a twelfth lens L12 arranged in sequence. The third lens L3 is disposed between the second lens L2 and the forth lens L4. Refractive powers of the third lens L3 to the twelfth lens L12 are positive, negative, positive, negative, negative, positive, negative, positive, negative, and positive, respectively.

In the embodiment, a focal length of the projection lens 100 is F, a focal length of the first lens group G1 is F1, a focal length of the second lens group G2 is F2, and a focal lens of the third lens group G3 is F3. The projection lens 100 may satisfy following three conditions: (1) $9.5 \leq |F1/F| \leq 12.5$; (2) $1.5 \leq |F2/F| \leq 2.2$; and (3) $4.5 \leq |F3/F| \leq 6.5$. In another embodiment, the projection lens 100 may satisfy following three conditions: (1) $9.5 \leq |F1/F| \leq 14.5$; (2) $0.68 \leq |F2/F| \leq 9$; and (3) $4 \leq |F3/F| \leq 140$. Further, the first lens L1 may be a convex-concave lens with a convex surface facing the first lens group G1, the second lens L2 may be a biconcave lens, the third lens L3 may be a biconvex lens, the forth lens L4 may be a convex-concave lens with a convex surface facing the third lens L3, the fifth lens L5 may be a biconvex lens, the sixth lens L6 may be a convex-concave lens with a convex surface facing the seventh lens L7, the seventh lens L7 may be a convex-concave lens with a convex surface facing the sixth lens L6, the eighth lens L8 may be a concave-convex lens with a convex surface facing the seventh lens L7, the ninth lens L9 may be a convex-concave lens with a convex surface facing the eighth lens L8, the tenth lens L10 may be a biconvex lens, the eleventh lens L11 may be a convex-concave lens with a convex surface facing the twelfth lens L12, and the twelfth lens L12 may be a biconvex lens.

For reducing a length of the projection lens 100, the fifth lens L5 and the sixth lens L6 may be combined to form a first compound lens, the seventh lens L7 and the eighth lens L8 may be combined to form a second compound lens, and the ninth lens L9, the tenth lens L10 and the eleventh lens L11 may be combined to form a third compound lens. Moreover, the first lens group G1 and the second lens group G2 are, for example, movable. When an interval between a screen (not shown) and the first lens group G1 is changed, the first lens group G1 and the second lens group G2 may be shifted to change relative positions between the first lens group G1, the second lens group G2, and the third lens group G3. Thus, even though the interval between the screen and the first lens group G1 is changed, the projection lens 100 may still focus on the screen. Furthermore, the projection lens 100 may further include an aperture stop disposed on a surface S21 of the eleventh lens L11, wherein the surface S21 of the eleventh lens L11 faces the twelfth lens L12. Since the aperture stop is disposed on the surface S21, the aperture stop is omitted in FIG. 1. In another embodiment, the aperture stop may be disposed between the eleventh lens L11 and the twelfth lens L12.

In the projection lens 100 of the embodiment, the first lens group G1 and the second lens group G2 may be used to effectively correct distortion, and a combination of the refractive powers of the lenses L3 to L12 of the third lens group G3 may be used to effectively eliminate field curvature, astigmatism, spherical aberration and chromatic aberration. Therefore, the projection lens 100 of the embodiment may achieve the advantages of wide viewing angle and high imaging quality. Furthermore, the number of the lenses used in the projection lens 100 of the embodiment is relatively small, so that a size and a cost of the projection lens 100 may be reduced. Moreover, the lenses L3 to L12 of the third lens group G3 have specific structures respectively, so that the cooperation of the lenses L3 to L12 of the third lens group G3 may reduce the intervals between the lenses L3 to L12 and even enable the third lens group G3 to include three compound lenses. Therefore, the length of the projection lens 100 may be further reduced.

Detail data of six embodiments of the projection lens 100 will be shown bellow. In Table 1, Table 3, Table 5, Table 7, Table 9, and Table 11, the interval means the distance between the surface N and the surface N+1 in an optical axis 102, wherein "N" represents the surface number. The surface S1 (not shown in FIG. 1) is a surface of the screen and the interval of the surface S25 means the distance between the surface S25 of a protection glass 50 and the light valve 60. It should be noted that the invention is not limited by the data shown in Table 1 to Table 12, one skilled in the art could properly modify the parameters and the design of the embodiment after reading the specification of the invention, however it is within the scope and spirit of the invention disclosed herein.

First Embodiment

Detail data of the first embodiment will be shown in Table 1 and Table 2.

TABLE 1

| Surface number | Curvature radius (mm) | Interval (mm) | Refractive index | Abbe's number | Note |
|---|---|---|---|---|---|
| S1 | Infinity | 954.09 | | | Screen |
| S2 | 64.81 | 5.7 | 1.49 | 57.4 | L13 |
| S3 | 24.48 | 15.9 | | | |
| S4 | 77.04 | 3.2 | 1.71 | 53.9 | L1 |
| S5 | 18.88 | 15.6 | | | |
| S6 | −98.46 | 2.4 | 1.77 | 49.6 | L2 |
| S7 | 28.33 | 19.27 | | | |
| S8 | 42.6 | 7 | 1.65 | 33.8 | L3 |
| S9 | −74.52 | 0.15 | | | |
| S10 | 63.67 | 2.05 | 1.5 | 81.5 | L4 |
| S11 | 21.39 | 4.43 | | | |
| S12 | 66.34 | 8.9 | 1.7 | 30.1 | L5 |
| S13 | −19.33 | 2.9 | 1.85 | 23.8 | L6 |
| S14 | −358.86 | 0.15 | | | |
| S15 | 20.86 | 2.98 | 1.85 | 23.8 | L7 |
| S16 | 16.06 | 14.37 | 1.65 | 33.8 | L8 |
| S17 | 266.65 | 4.12 | | | |
| S18 | 58.23 | 1.1 | 1.83 | 37.2 | L9 |
| S19 | 10.11 | 6.9 | 1.49 | 70.2 | L10 |
| S20 | −10.07 | 1 | 1.83 | 37.2 | L11 |
| S21 | −22.34 | 0.15 | | | |
| S22 | 76.76 | 7.09 | 1.5 | 81.5 | L12 |
| S23 | −16.57 | 21.5 | | | |
| S24 | Infinity | 1.05 | 1.51 | 63.1 | Protection glass |
| S25 | Infinity | 1.1 | | | |

In Table 1, the interval of the surface S3 is a variable distance, wherein the longest distance of the interval of the surface S3 is 17 mm and the shortest distance of the interval of the surface S3 is 14.5 mm. The interval of the surface S7 is a variable distance, wherein the longest distance of the interval of the surface S7 is 26.3 mm and the shortest distance of the interval of the surface S7 is 19.3 mm. Furthermore, a focal length of the projection lens 100 of the first embodiment ranges between 6.7 mm and 7.3 mm. An F-number of the projection lens 100 of the first embodiment ranges between 2.57 and 2.63. The viewing angle (2ω) of the projection lens 100 of the first embodiment is greater than 100 degrees.

Moreover, the surfaces S2 and S3 are two aspheric surfaces of the aspheric lens L13, and the surfaces S2 and S3 satisfy the following equation:

$$Z(h) = \frac{h^2/r}{1+\sqrt{1-(1+k)(h^2/r^2)}} + C_2 h^2 + C_4 h^4 + C_6 h^6 + C_8 h^8 + C_{10} h^{10} + C_{12} h^{12} + \ldots$$

In the above equation, "Z(h)" represents a sag in a direction of the optical axis 102. "r" represents a radius of an osculating sphere, that is, the curvature radius of the position near the optical axis 102 (for example, the curvature radiuses of the surface S2 and S3 in Table 1). "k" represents a conic constant. "h" represents a height of the aspheric surface, that is, a height from a center of the aspheric lens to an edge of the aspheric lens. "$C_2$", "$C_4$", "$C_6$", "$C_8$", "$C_{10}$" and "$C_{12}$" etc. respectively represent aspheric coefficients. Values of k, $C_2$, $C_4$, $C_6$, $C_8$, $C_{10}$ and $C_{12}$ are shown in Table 2.

TABLE 2

| | Surface S2 | Surface S3 |
|---|---|---|
| k | −0.555919334 | −0.830917981 |
| $C_2$ | 0 | 0 |
| $C_4$ | 1.8368E−06 | 1.02359E−06 |
| $C_6$ | −1.13266E−09 | −1.00442E−08 |
| $C_8$ | 1.04159E−12 | 4.56504E−12 |
| $C_{10}$ | −3.09319E−16 | −5.06879E−16 |
| $C_{12}$ | 7.17272E−20 | −8.16739E−20 |

Figure 2A:
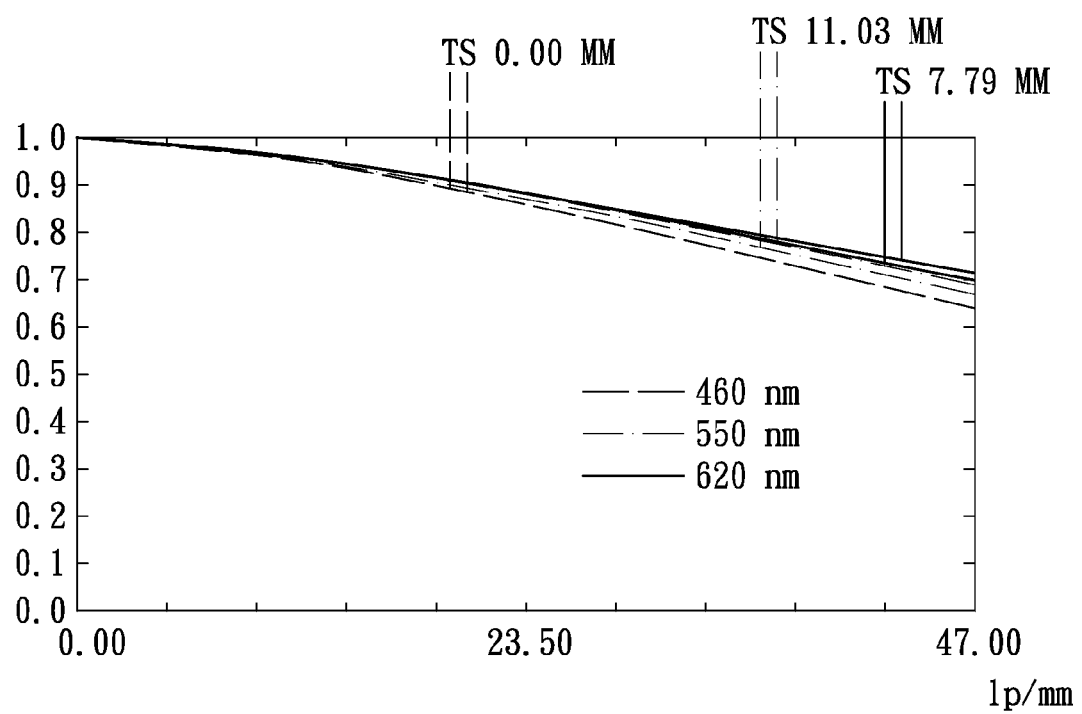
FIG. 2A shows a modulation transfer function (MTF) of the projection lens of the first embodiment.
Figure 2B:
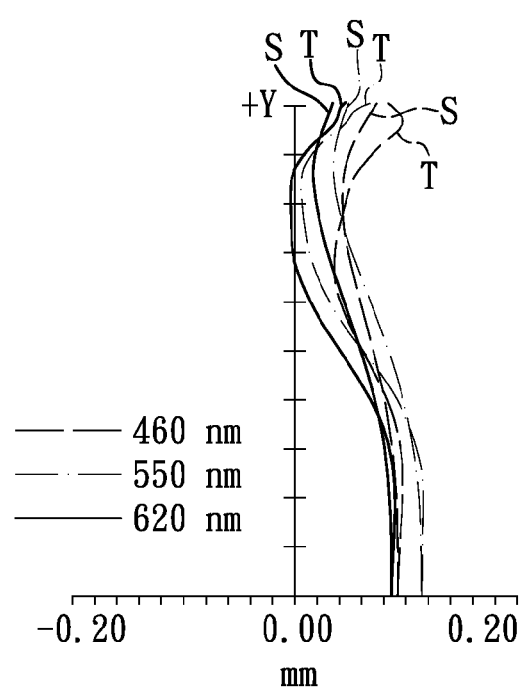
FIG. 2B is a diagram of field curvature of the projection lens of the first embodiment.
Figure 2C:
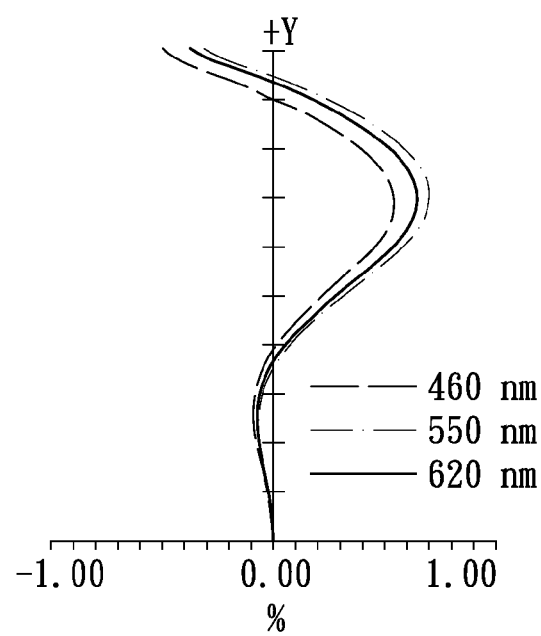
FIG. 2C is a diagram of distortion of the projection lens of the first embodiment.
Figure 2D:
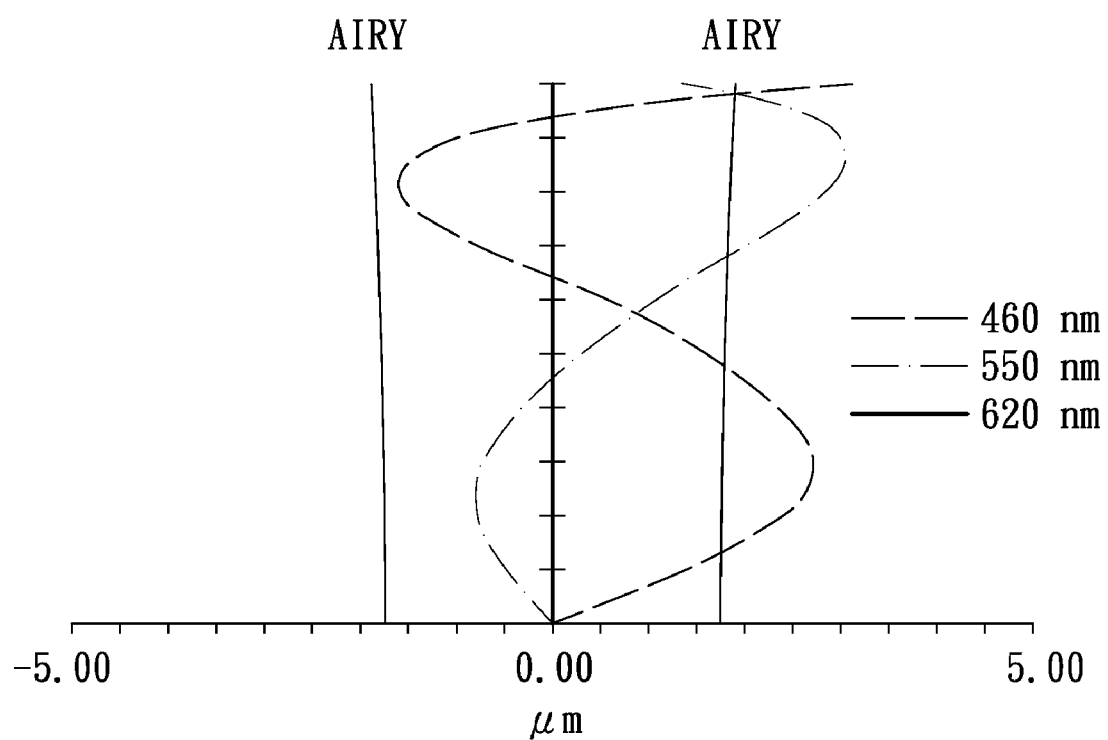
FIG. 2D is a diagram of lateral color of the projection lens of the first embodiment.
Figure 2E:
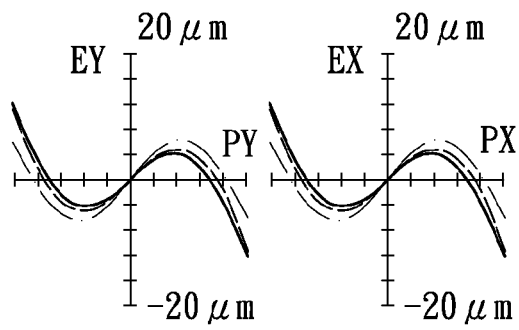
FIG. 2E is a transverse ray fan plot of the projection lens of the first embodiment.
Figure 2E:
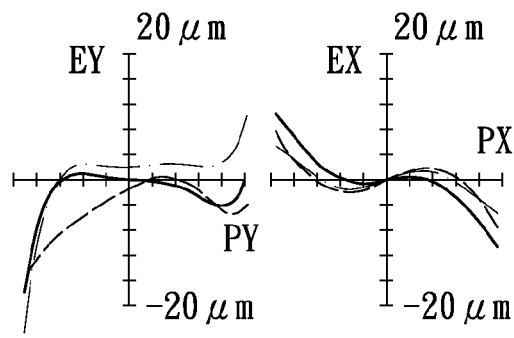
Figure 2E:
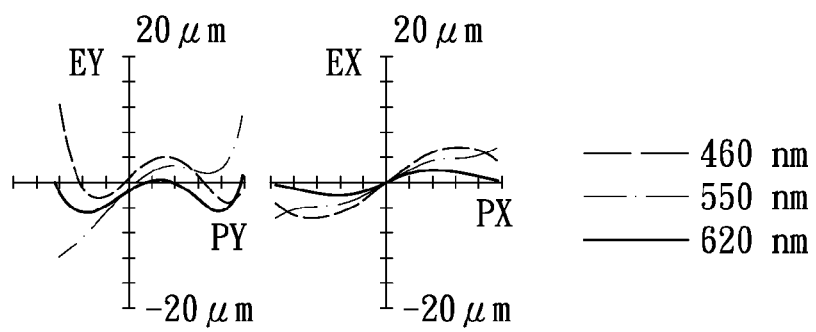

FIG. 2A shows a modulation transfer function (MTF) of the projection lens of the first embodiment, wherein a traverse axis in FIG. 2A represents the number of line pair per millimeter (lp/mm), and a longitudinal axis in FIG. 2A represents a recognizability. FIG. 2B is a diagram of field curvature of the projection lens of the first embodiment. FIG. 2C is a diagram of distortion of the projection lens of the first embodiment. FIG. 2D is a diagram of lateral color of the projection lens of the first embodiment. FIG. 2E is a transverse ray fan plot of the projection lens of the first embodiment.

Since the graphs shown in FIGS. 2A to 2E are respectively within the standard ranges, they may prove that the projection lens 100 of the first embodiment not only has a wide viewing angle, but also has a compact size and a lower cost in a condition of maintaining high imaging quality.

Second Embodiment

Detail data of the second embodiment will be shown in Table 3 and Table 4.

TABLE 3

| Surface number | Curvature radius (mm) | Interval (mm) | Refractive index | Abbe's number | Note |
|---|---|---|---|---|---|
| S1 | Infinity | 954 | | | Screen |
| S2 | 54.58 | 9.88 | 1.49 | 57.4 | L13 |
| S3 | 24.12 | Variable distance | | | |
| S4 | 63.75 | 5.6 | 1.6 | 60.7 | L1 |
| S5 | 18.8 | 14.56 | | | |
| S6 | −221.92 | 1.8 | 1.81 | 40.2 | L2 |
| S7 | 21.47 | Variable distance | | | |
| S8 | 109.6 | 5.71 | 1.64 | 36. | L3 |

TABLE 3-continued

| Surface number | Curvature radius (mm) | Interval (mm) | Refractive index | Abbe's number | Note |
|---|---|---|---|---|---|
| S9 | −48.03 | 0.15 | | | |
| S10 | 47.1 | 1.8 | 1.54 | 70.1 | L4 |
| S11 | 20.66 | 3.05 | | | |
| S12 | 55.64 | 6.38 | 1.66 | 30.4 | L5 |
| S13 | −24.22 | 1.8 | 1.84 | 27.2 | L6 |
| S14 | 941.74 | 0.15 | | | |
| S15 | 17.41 | 2.08 | 1.85 | 23.8 | L7 |
| S16 | 12.78 | 9.34 | 1.64 | 31.5 | L8 |
| S17 | 217.04 | 5.86 | | | |
| S18 | 40.58 | 2.64 | 1.83 | 30.1 | L9 |
| S19 | 9.76 | 4 | 1.50 | 79.6 | L10 |
| S20 | −9.91 | 1.8 | 1.82 | 34.5 | L11 |
| S21 | −20.4 | 6.6 | | | |
| S22 | 160.84 | 2.65 | 1.5 | 81.6 | L12 |
| S23 | −21.5 | 16.63 | | | |
| S24 | Infinity | 1.05 | 1.51 | 63.1 | Protection glass |
| S25 | Infinity | 1.1 | | | |

In Table 3, the interval of the surface S3 is a variable distance, wherein the longest distance of the interval of the surface S3 is 14.8 mm and the shortest distance of the interval of the surface S3 is 13.394 mm. The interval of the surface S7 is a variable distance, wherein the longest distance of the interval of the surface S7 is 26.137 mm and the shortest distance of the interval of the surface S7 is 25.845 mm. Furthermore, a focal length of the projection lens 100 of the second embodiment ranges between 6.68 mm and 6.8 mm. An F-number of the projection lens 100 of the second embodiment is about 2.48. The viewing angle (2ω) of the projection lens 100 of the second embodiment ranges between 113 degrees and 118 degrees. F1/F is about −14.5. Moreover, the surfaces S2 and S3 are two aspheric surfaces of the aspheric lens L13, and detail data of the surfaces S2 and S3 will be shown in Table 4.

TABLE 4

| | Surface S2 | Surface S3 |
|---|---|---|
| k | −0.433728407 | −0.806954081 |
| $C_2$ | 0 | 0 |
| $C_4$ | 5.70621E−07 | 2.02382E−06 |
| $C_6$ | −6.09027E−10 | −1.01629E−08 |
| $C_8$ | 8.57839E−13 | 4.31799E−12 |
| $C_{10}$ | −3.98601E−16 | −6.31697E−16 |
| $C_{12}$ | 1.03466E−19 | −1.89845E−20 |

Figure 3A:
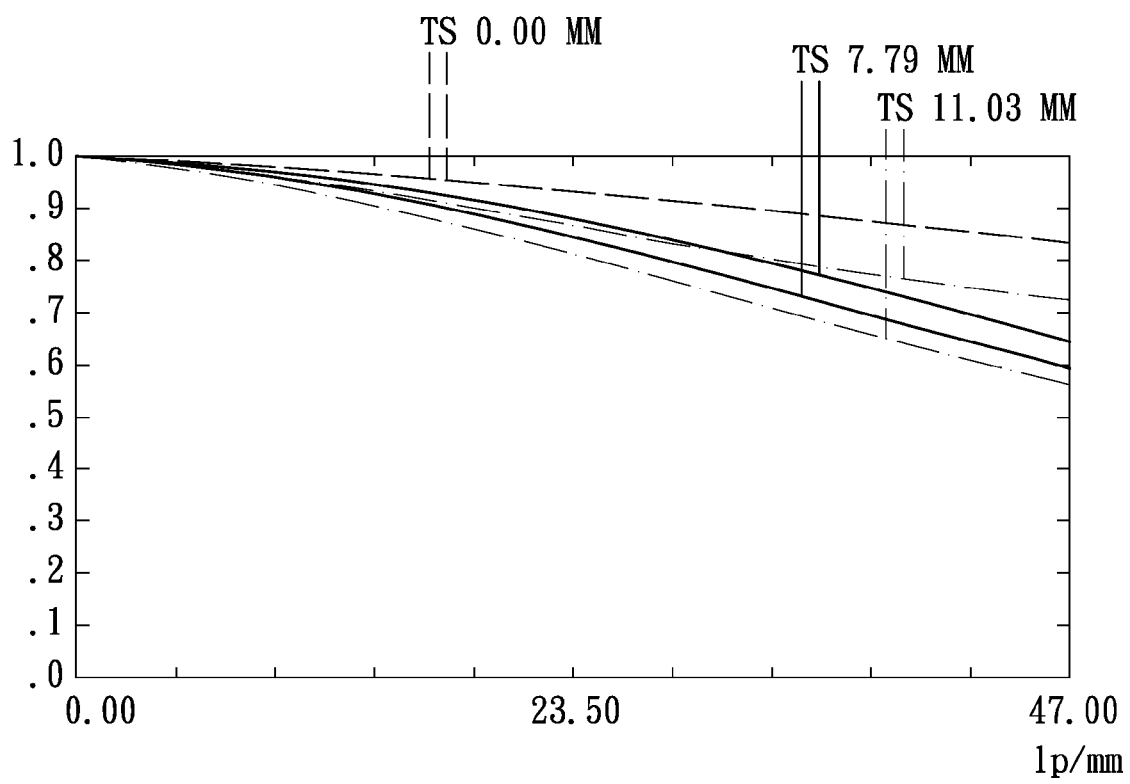
FIG. 3A shows a MTF of the projection lens of the second embodiment.
Figure 3B:
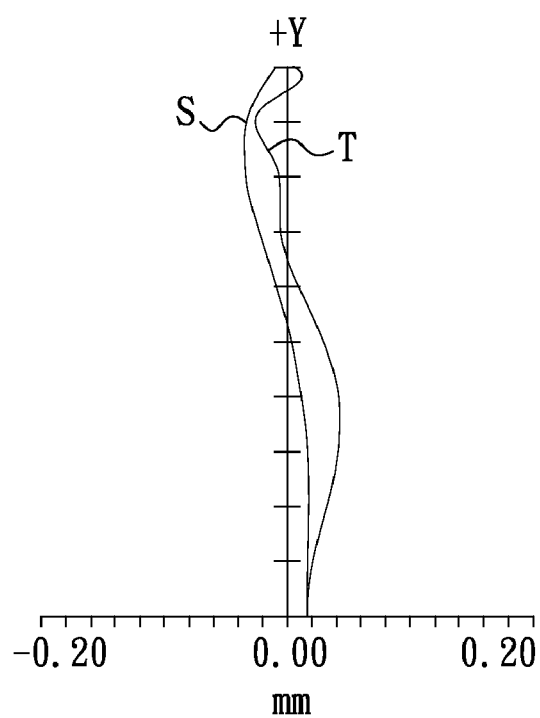
FIG. 3B is a diagram of field curvature of the projection lens of the second embodiment.
Figure 3C:
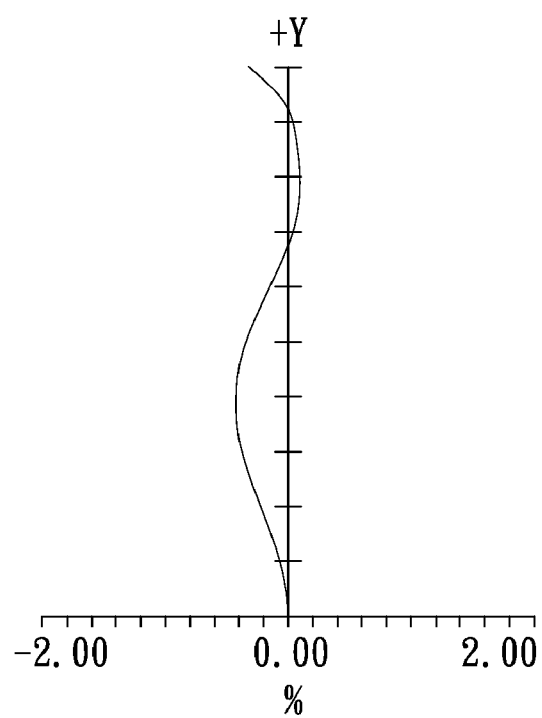
FIG. 3C is a diagram of distortion of the projection lens of the second embodiment.
Figure 3D:
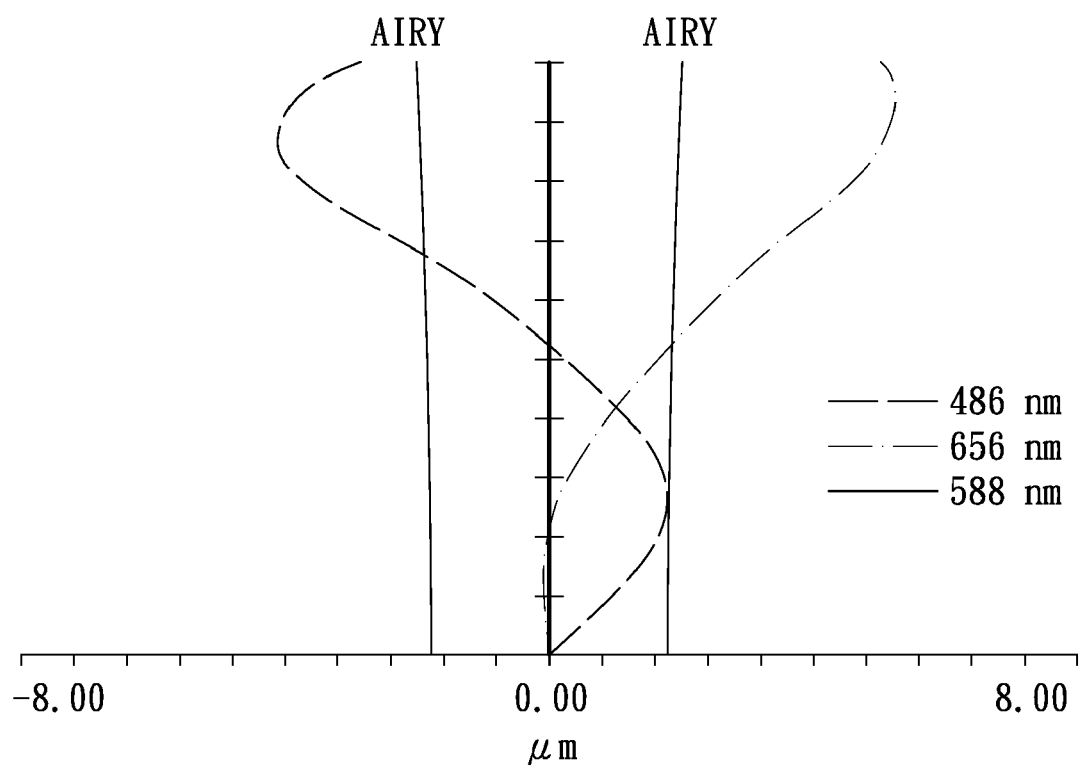
FIG. 3D is a diagram of lateral color of the projection lens of the second embodiment.
Figure 3E:
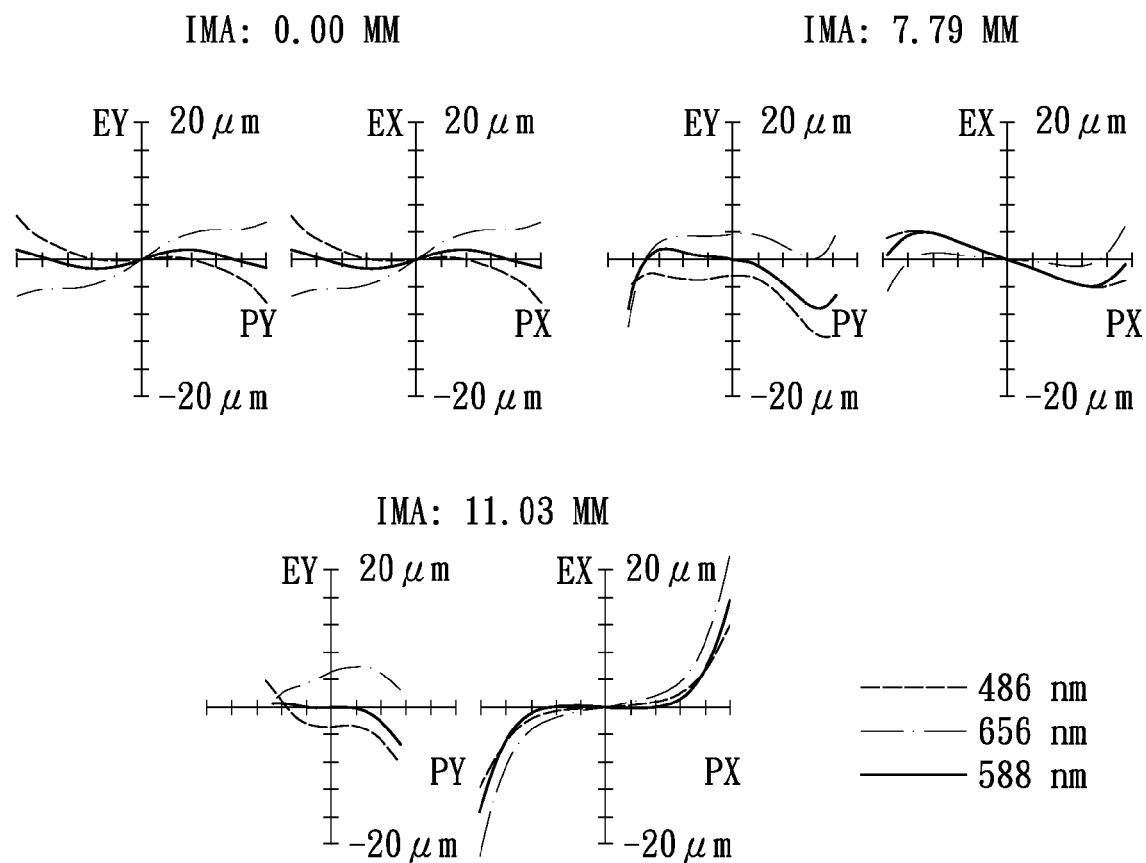
FIG. 3E is a transverse ray fan plot of the projection lens of the second embodiment.

FIG. 3A shows a MTF of the projection lens of the second embodiment. FIG. 3B is a diagram of field curvature of the projection lens of the second embodiment. FIG. 3C is a diagram of distortion of the projection lens of the second embodiment. FIG. 3D is a diagram of lateral color of the projection lens of the second embodiment. FIG. 3E is a transverse ray fan plot of the projection lens of the second embodiment.

Since the graphs shown in FIGS. 3A to 3E are respectively within the standard ranges, they may prove that the projection lens 100 of the second embodiment not only has a wide viewing angle, but also has a compact size and a lower cost in a condition of maintaining high imaging quality.

Third Embodiment

Detail data of the third embodiment will be shown in Table 5 and Table 6.

TABLE 5

| Surface number | Curvature radius (mm) | Interval (mm) | Refractive index | Abbe's number | Note |
|---|---|---|---|---|---|
| S1 | Infinity | 954.09 | | | Screen |
| S2 | 64.43 | 8.84 | 1.49 | 57.4 | L13 |
| S3 | 24.07 | Variable distance | | | |
| S4 | 90.74 | 2.05 | 1.8 | 46.6 | L1 |
| S5 | 21.03 | 27.12 | | | |
| S6 | −34.66 | 10 | 1.82 | 33.9 | L2 |
| S7 | 19.24 | Variable distance | | | |
| S8 | 118.29 | 3.27 | 1.85 | 23.8 | L3 |
| S9 | −52.1 | 0.15 | | | |
| S10 | 55.51 | 1.8 | 1.5 | 80.5 | L4 |
| S11 | 34.53 | 0.21 | | | |
| S12 | 34.73 | 6.07 | 1.72 | 27.5 | L5 |
| S13 | −32.03 | 1.8 | 1.8 | 46.6 | L6 |
| S14 | −322.19 | 0.15 | | | |
| S15 | 21.02 | 1.8 | 1.85 | 23.8 | L7 |
| S16 | 13.38 | 9.04 | 1.65 | 34.8 | L8 |
| S17 | −34.64 | 4.04 | | | |
| S18 | −286.31 | 1.8 | 1.84 | 27.2 | L9 |
| S19 | 10.65 | 4.31 | 1.50 | 75.1 | L10 |
| S20 | −10.08 | 1.8 | 1.83 | 27.8 | L11 |
| S21 | −17.43 | 4.23 | | | |
| S22 | 109.42 | 10 | 1.5 | 81.6 | L12 |
| S23 | −23.03 | 19.09 | | | |
| S24 | Infinity | 1.05 | 1.51 | 63.1 | Protection glass |
| S25 | Infinity | 1.1 | | | |

In Table 5, the interval of the surface S3 is a variable distance, wherein the longest distance of the interval of the surface S3 is 19.82 mm and the shortest distance of the interval of the surface S3 is 18.31 mm. The interval of the surface S7 is a variable distance, wherein the longest distance of the interval of the surface S7 is 3.29 mm and the shortest distance of the interval of the surface S7 is 3.24 mm. Furthermore, a focal length of the projection lens 100 of the third embodiment ranges between 6.91 mm and 7.02 mm. An F-number of the projection lens 100 of the third embodiment is about 2.82. The viewing angle (2ω) of the projection lens 100 of the third embodiment ranges between 112 degrees and 115.86 degrees. F2/F is about −0.68. Moreover, the surfaces S2 and S3 are two aspheric surfaces of the aspheric lens L13, and detail data of the surfaces S2 and S3 will be shown in Table 6.

TABLE 6

| | Surface S2 | Surface S3 |
|---|---|---|
| k | −0.34154246 | −0.822565471 |
| $C_2$ | 0 | 0 |
| $C_4$ | 8.01106E−07 | 1.17368E−06 |
| $C_6$ | −6.5655E−10 | −1.01404E−08 |
| $C_8$ | 8.10546E−13 | 4.46237E−12 |
| $C_{10}$ | −3.78089E−16 | −5.44617E−16 |
| $C_{12}$ | 9.88165E−20 | −5.77455E−20 |

Figure 4A:
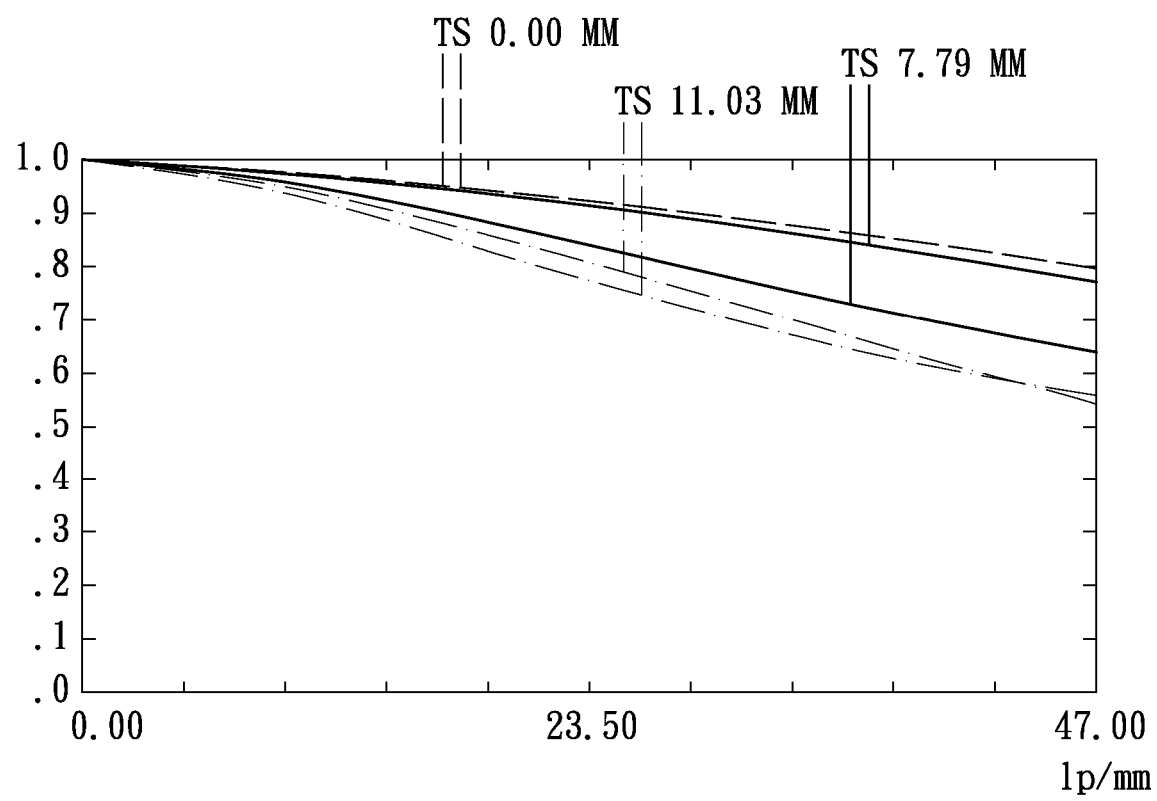
FIG. 4A shows a MTF of the projection lens of the third embodiment.
Figure 4B:
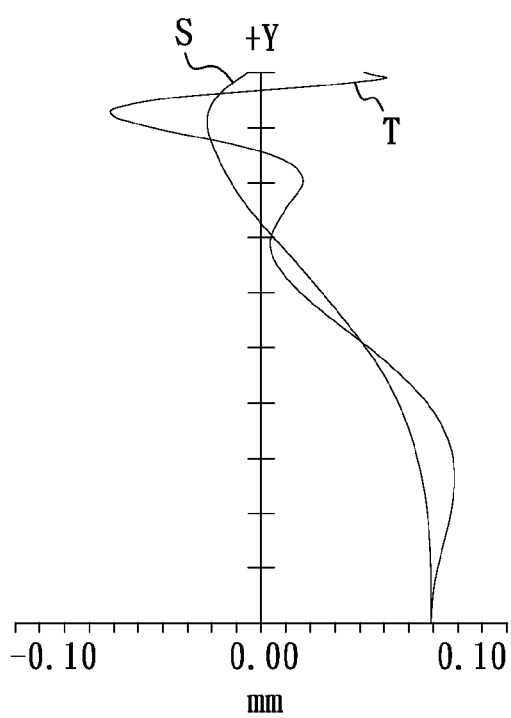
FIG. 4B is a diagram of field curvature of the projection lens of the third embodiment.
Figure 4C:
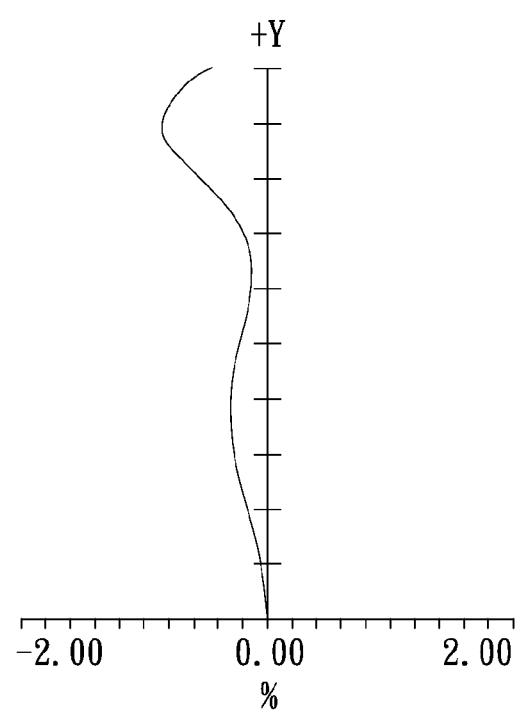
FIG. 4C is a diagram of distortion of the projection lens of the third embodiment.
Figure 4D:
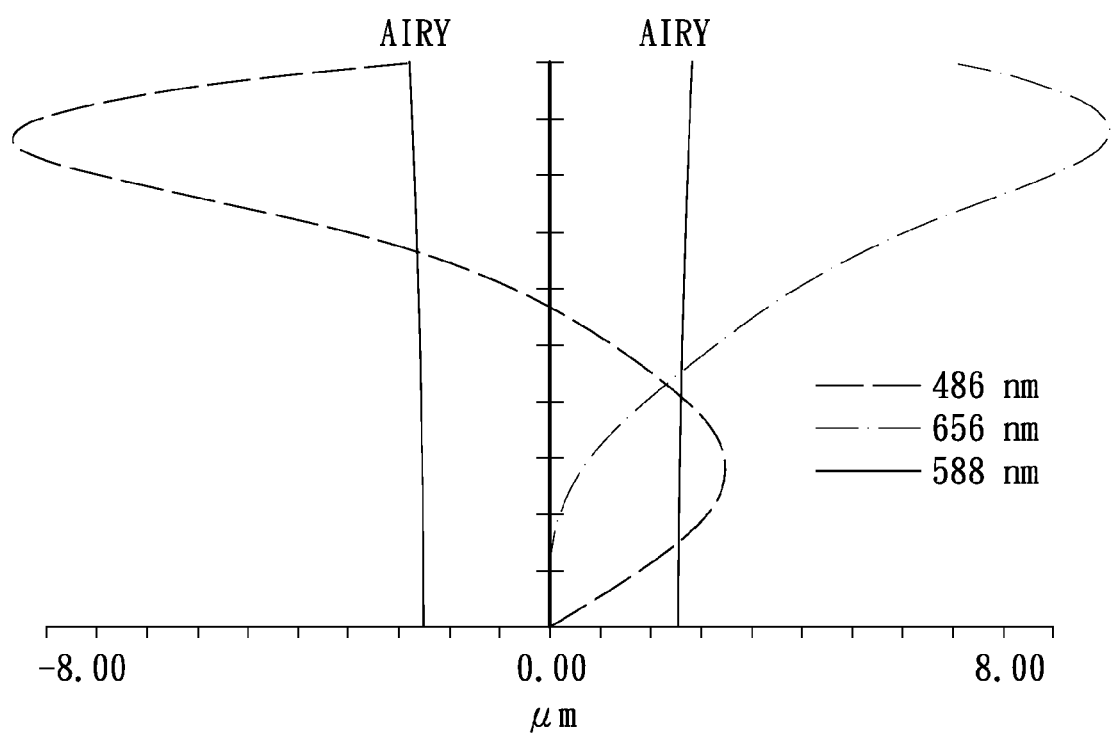
FIG. 4D is a diagram of lateral color of the projection lens of the third embodiment.
Figure 4E:
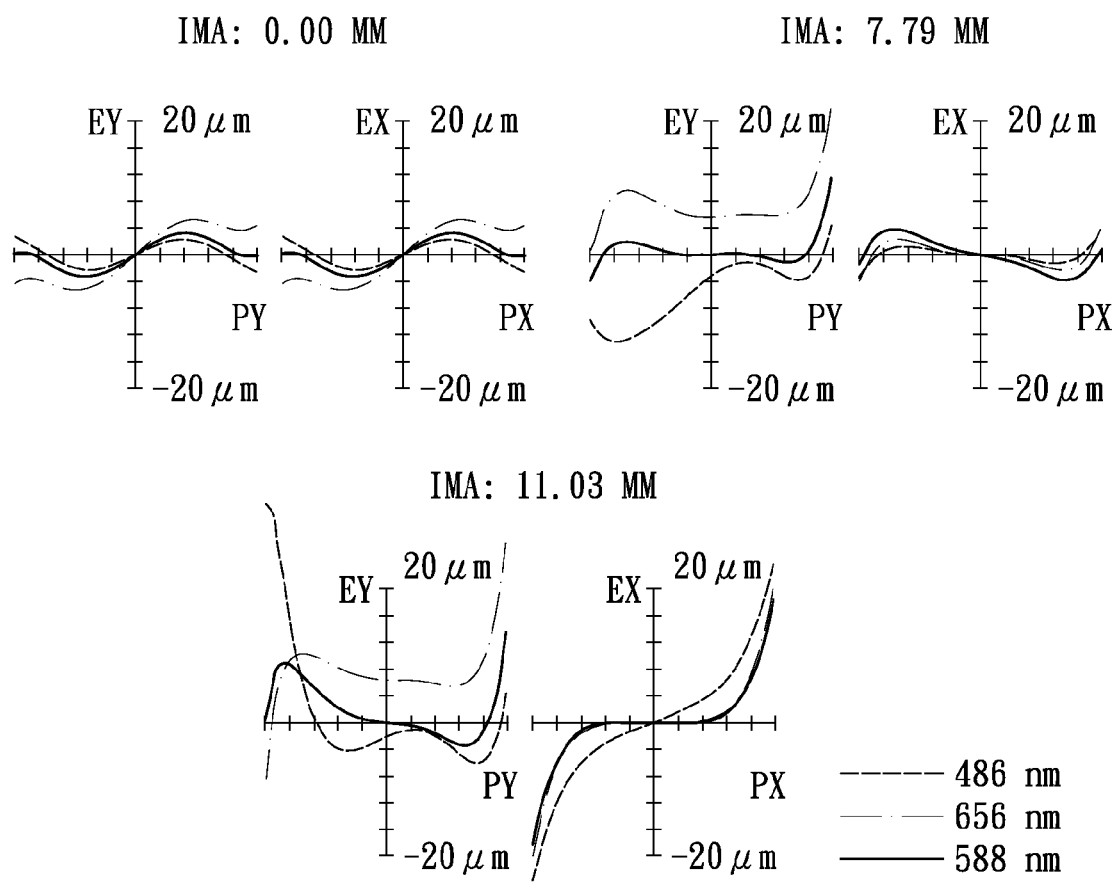
FIG. 4E is a transverse ray fan plot of the projection lens of the third embodiment.

FIG. 4A shows a MTF of the projection lens of the third embodiment. FIG. 4B is a diagram of field curvature of the projection lens of the third embodiment. FIG. 4C is a diagram of distortion of the projection lens of the third embodiment. FIG. 4D is a diagram of lateral color of the projection lens of the third embodiment. FIG. 4E is a transverse ray fan plot of the projection lens of the third embodiment.

Since the graphs shown in FIGS. 4A to 4E are respectively within the standard ranges, they may prove that the projection lens 100 of the third embodiment not only has a wide viewing angle, but also has a compact size and a lower cost in a condition of maintaining high imaging quality.

Fourth Embodiment

Detail data of the fourth embodiment will be shown in Table 7 and Table 8.

TABLE 7

| Surface number | Curvature radius (mm) | Interval (mm) | Refractive index | Abbe's number | Note |
|---|---|---|---|---|---|
| S1 | Infinity | 954 | | | Screen |
| S2 | 67.76 | 1.9 | 1.49 | 57.4 | L13 |
| S3 | 16.28 | Variable distance | | | |
| S4 | 32.81 | 1.8 | 1.79 | 47.2 | L1 |
| S5 | 24.57 | 7.06 | | | |
| S6 | 31.59 | 1.8 | 1.5 | 80.3 | L2 |
| S7 | 19.87 | Variable distance | | | |
| S8 | 81.67 | 6.61 | 1.54 | 50.4 | L3 |
| S9 | −49.61 | 0.15 | | | |
| S10 | −53.29 | 2.86 | 1.8 | 46.6 | L4 |
| S11 | 23.44 | 3.94 | | | |
| S12 | 111.83 | 9.04 | 1.61 | 34.1 | L5 |
| S13 | −18.24 | 10 | 1.8 | 46.6 | L6 |
| S14 | −39.94 | 12.61 | | | |
| S15 | 22.17 | 1.8 | 1.85 | 23.8 | L7 |
| S16 | 15.64 | 9.78 | 1.65 | 34.6 | L8 |
| S17 | −211.11 | 8 | | | |
| S18 | 23.95 | 2.72 | 1.77 | 27.6 | L9 |
| S19 | 9.91 | 4.03 | 1.5 | 81.6 | L10 |
| S20 | −13.37 | 1.8 | 1.83 | 30.8 | L11 |
| S21 | −35.99 | 10.9 | | | |
| S22 | 114.73 | 3.04 | 1.8 | 46.6 | L12 |
| S23 | −52.39 | 10.17 | | | |
| S24 | Infinity | 1.05 | 1.51 | 63.1 | Protection glass |
| S25 | Infinity | 1.1 | | | |

In Table 7, the interval of the surface S3 is a variable distance, wherein the longest distance of the interval of the surface S3 is 16.76 mm and the shortest distance of the interval of the surface S3 is 11.38 mm. The interval of the surface S7 is a variable distance, wherein the longest distance of the interval of the surface S7 is 15.01 mm and the shortest distance of the interval of the surface S7 is 14.56 mm. Furthermore, a focal length of the projection lens 100 of the fourth embodiment ranges between 6.35 mm and 6.8 mm. An F-number of the projection lens 100 of the fourth embodiment is about 2.6. The viewing angle (2ω) of the projection lens 100 of the fourth embodiment ranges between 113.32 degrees and 117.62 degrees. F2/F is about −9. Moreover, the surfaces S2 and S3 are two aspheric surfaces of the aspheric lens L13, and detail data of the surfaces S2 and S3 will be shown in Table 8.

TABLE 8

| | Surface S2 | Surface S3 |
|---|---|---|
| k | 0.01878 | −0.80607 |
| $C_2$ | 0 | 0 |
| $C_4$ | 2.2643E−07 | 6.2061E−06 |
| $C_6$ | −1.0324E−09 | −7.1045E−09 |
| $C_8$ | 9.4658E−13 | −4.2797E−13 |
| $C_{10}$ | −3.3818E−16 | −1.3401E−15 |
| $C_{12}$ | 5.0454E−20 | −1.5299E−18 |

Figure 5A:
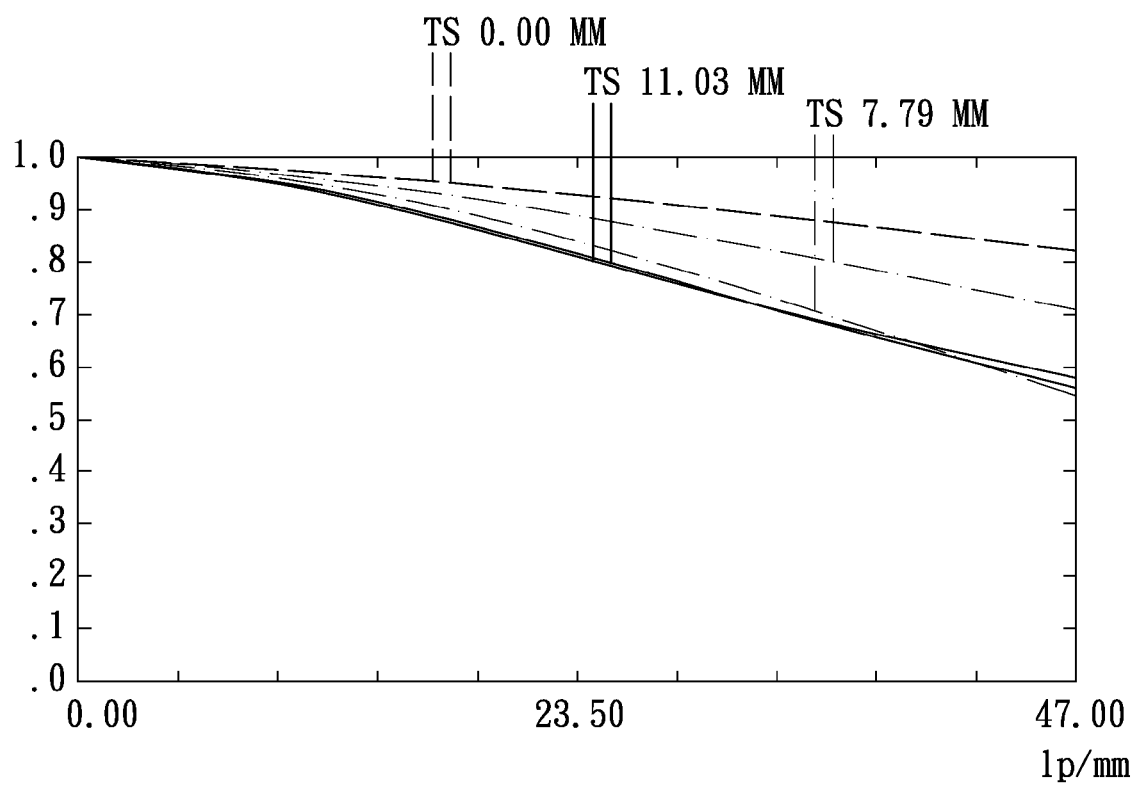
FIG. 5A shows a MTF of the projection lens of the fourth embodiment.
Figure 5B:
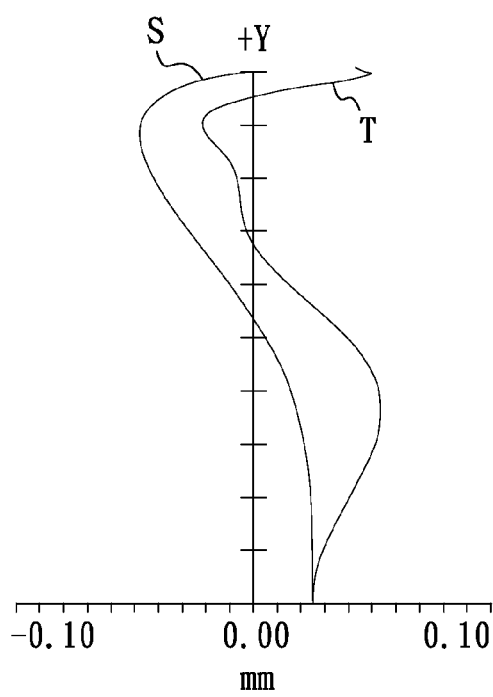
FIG. 5B is a diagram of field curvature of the projection lens of the fourth embodiment.
Figure 5C:
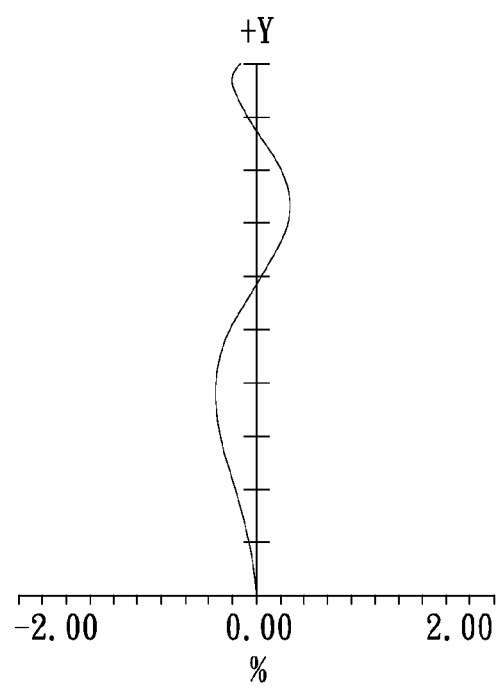
FIG. 5C is a diagram of distortion of the projection lens of the fourth embodiment.
Figure 5D:
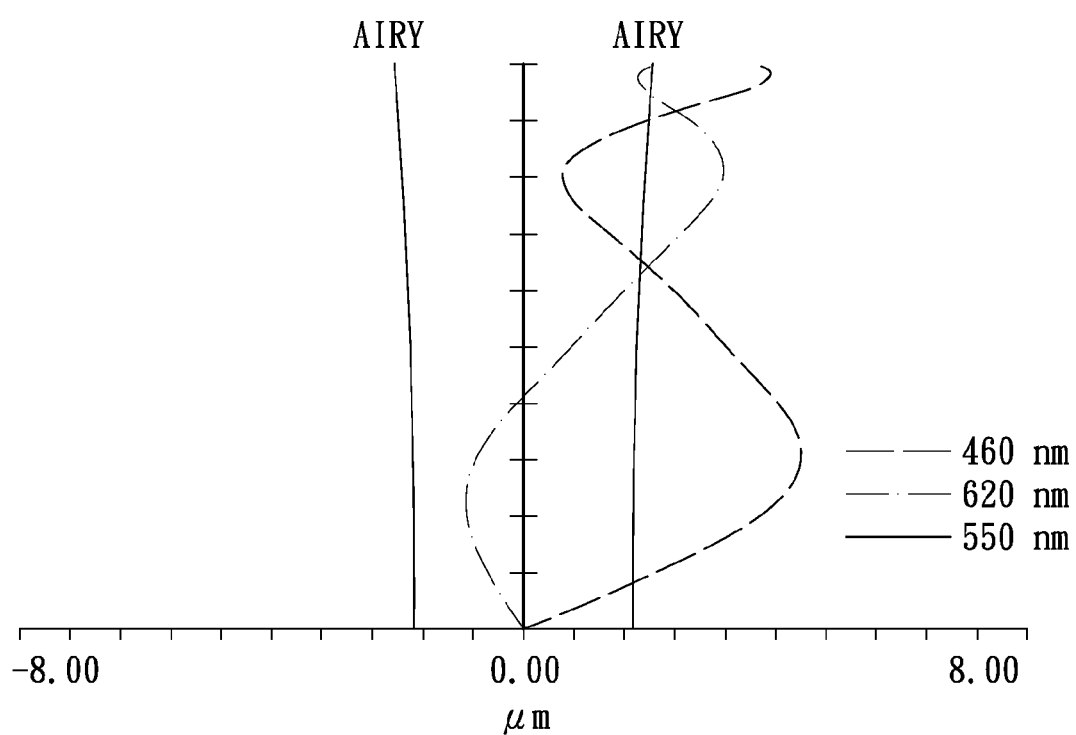
FIG. 5D is a diagram of lateral color of the projection lens of the fourth embodiment.
Figure 5E:
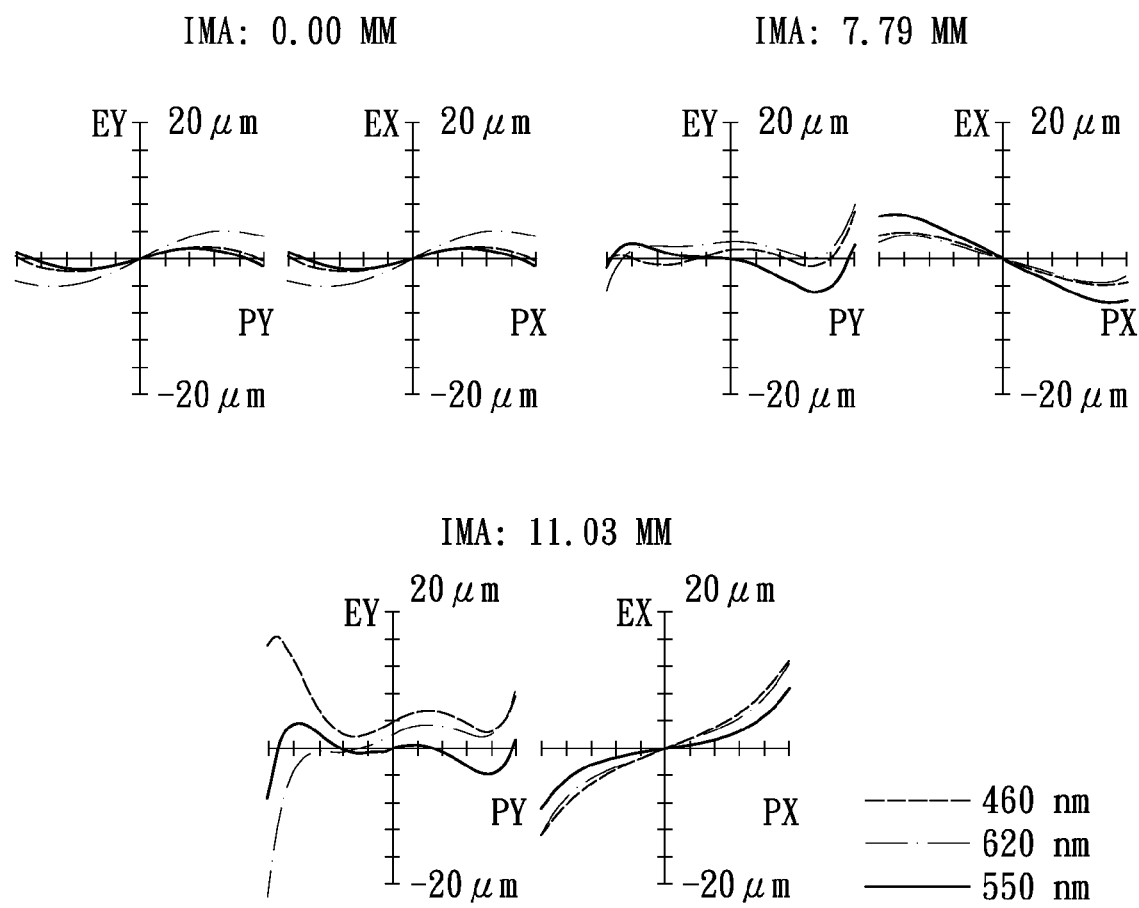
FIG. 5E is a transverse ray fan plot of the projection lens of the fourth embodiment.

FIG. 5A shows a MTF of the projection lens of the fourth embodiment. FIG. 5B is a diagram of field curvature of the projection lens of the fourth embodiment. FIG. 5C is a diagram of distortion of the projection lens of the fourth embodiment. FIG. 5D is a diagram of lateral color of the projection lens of the fourth embodiment. FIG. 5E is a transverse ray fan plot of the projection lens of the fourth embodiment.

Since the graphs shown in FIGS. 5A to 5E are respectively within the standard ranges, they may prove that the projection lens 100 of the fourth embodiment not only has a wide viewing angle, but also has a compact size and a lower cost in a condition of maintaining high imaging quality.

Fifth Embodiment

Detail data of the fifth embodiment will be shown in Table 9 and Table 10.

TABLE 9

| Surface number | Curvature radius (mm) | Interval (mm) | Refractive index | Abbe's number | Note |
|---|---|---|---|---|---|
| S1 | Infinity | 955.48 | | | Screen |
| S2 | 59.11 | 9.53 | 1.49 | 57.4 | L13 |
| S3 | 22.98 | Variable distance | | | |
| S4 | 49.8 | 2.48 | 1.71 | 53.9 | L1 |
| S5 | 19.61 | 12.88 | | | |
| S6 | −164.37 | 3.62 | 1.77 | 49.6 | L2 |
| S7 | 21.46 | Variable distance | | | |
| S8 | 92.52 | 5.69 | 1.65 | 33.8 | L3 |
| S9 | −54.94 | 0.15 | | | |
| S10 | 177.64 | 1.8 | 1.5 | 81.5 | L4 |
| S11 | 20.74 | 3.28 | | | |
| S12 | 60.17 | 8.03 | 1.7 | 30.1 | L5 |
| S13 | −18.6 | 7.42 | 1.85 | 23.8 | L6 |
| S14 | −91.75 | 0.15 | | | |
| S15 | 20.54 | 5.08 | 1.85 | 23.8 | L7 |
| S16 | 14.67 | 8.02 | 1.65 | 33.8 | L8 |
| S17 | −104.68 | 4.61 | | | |
| S18 | 262.14 | 1.8 | 1.83 | 37.2 | L9 |
| S19 | 10.01 | 5.05 | 1.49 | 70.2 | L10 |
| S20 | −9.21 | 1.8 | 1.83 | 37.2 | L11 |
| S21 | −20.25 | 0.15 | | | |
| S22 | 55.17 | 5.3 | 1.5 | 81.5 | L12 |
| S23 | −16.21 | 23.05 | | | |
| S24 | Infinity | 1.05 | 1.51 | 63.1 | Protection glass |
| S25 | Infinity | 1.1 | | | |

In Table 9, the interval of the surface S3 is a variable distance, wherein the longest distance of the interval of the surface S3 is 22.33 mm and the shortest distance of the interval of the surface S3 is 19.8 mm. The interval of the surface S7 is a variable distance, wherein the longest distance of the interval of the surface S7 is 12.12 mm and the shortest distance of the interval of the surface S7 is 11.88 mm. Furthermore, a focal length of the projection lens 100 of the fifth embodiment ranges between 6.87 mm and 7.07 mm. An F-number of the projection lens 100 of the fifth embodiment is about 2.66. The viewing angle (2ω) of the projection lens 100 of the fifth embodiment ranges between 113.32 degrees and 115.92 degrees. F3/F is about 4. Moreover, the surfaces S2 and S3 are two aspheric surfaces of the aspheric lens L13, and detail data of the surfaces S2 and S3 will be shown in Table 10.

TABLE 10

| | Surface S2 | Surface S3 |
|---|---|---|
| k | −1.717702 | −0.820895 |
| $C_2$ | 0 | 0 |
| $C_4$ | 9.4492E−07 | 1.3968E−06 |

TABLE 10-continued

|  | Surface S2 | Surface S3 |
|---|---|---|
| $C_6$ | −1.0019E−09 | −1.003E−08 |
| $C_8$ | 9.88527E−13 | 4.43443E−12 |
| $C_{10}$ | −3.67693E−16 | −5.77749E−16 |
| $C_{12}$ | 5.8208E−20 | −7.31481E−20 |

Figure 6A:
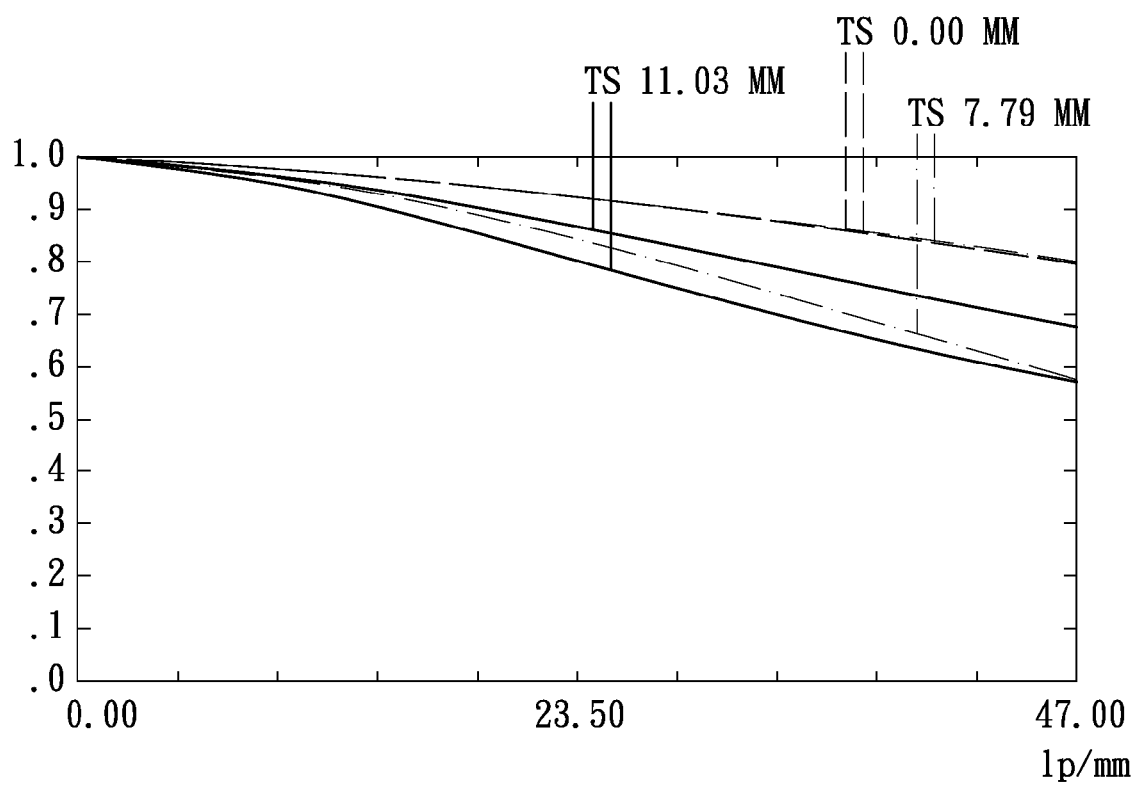
FIG. 6A shows a MTF of the projection lens of the fifth embodiment.
Figure 6B:
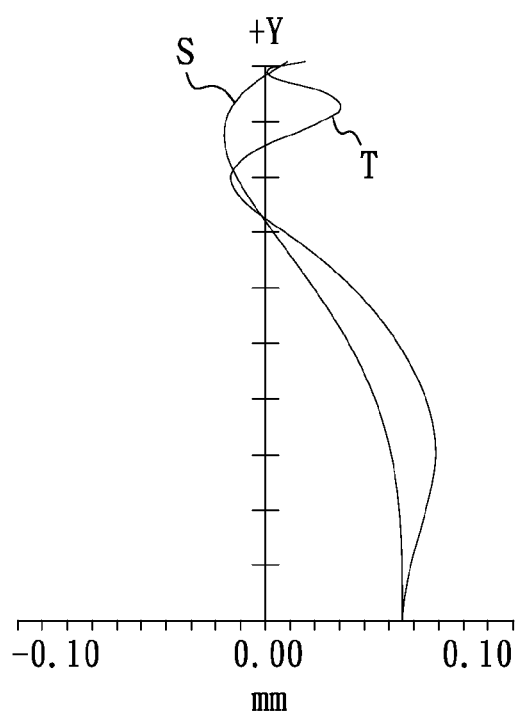
FIG. 6B is a diagram of field curvature of the projection lens of the fifth embodiment.
Figure 6C:
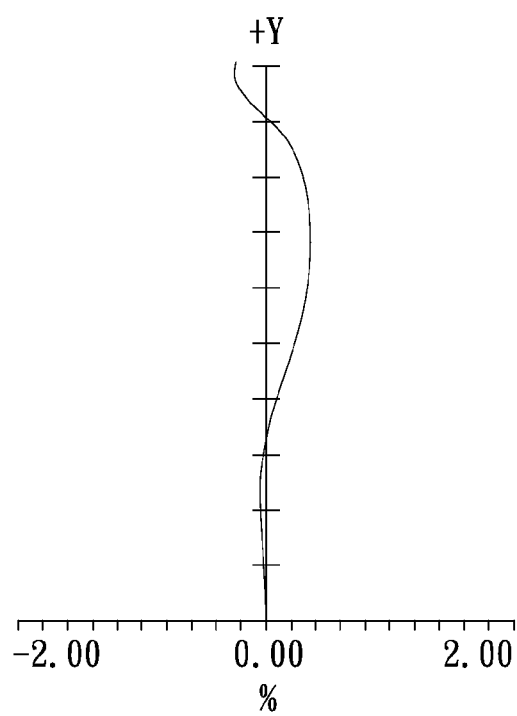
FIG. 6C is a diagram of distortion of the projection lens of the fifth embodiment.
Figure 6D:
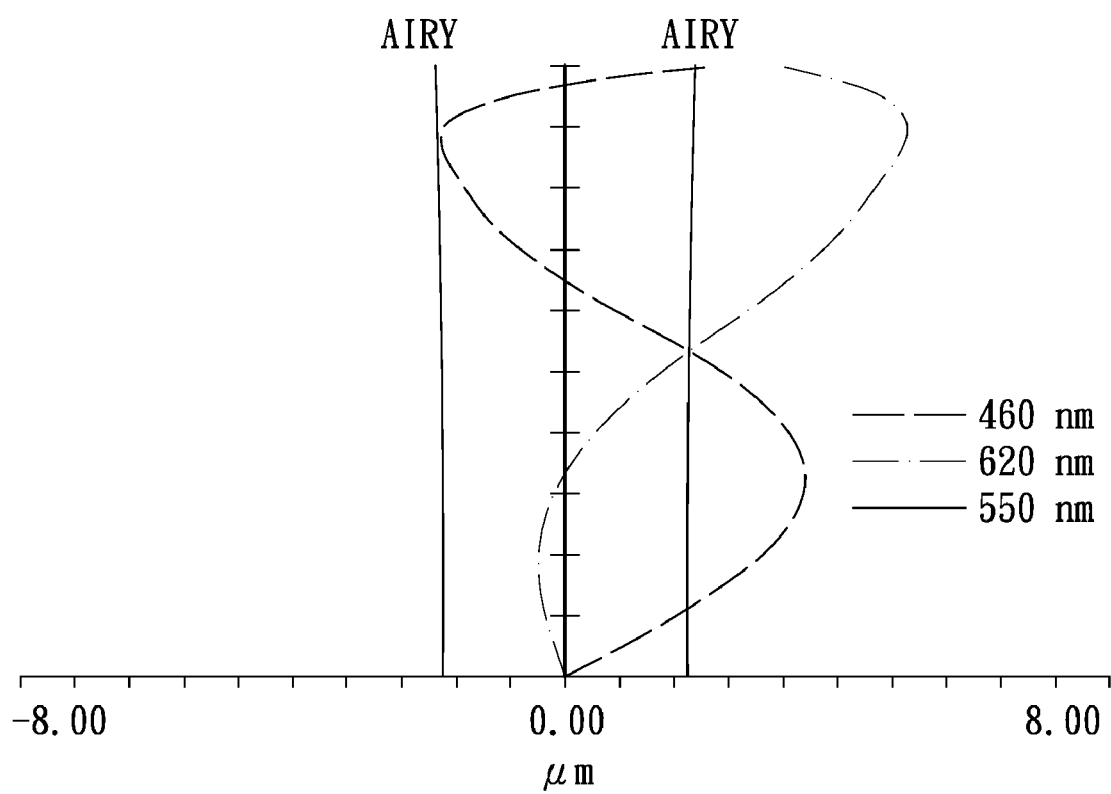
FIG. 6D is a diagram of lateral color of the projection lens of the fifth embodiment.
Figure 6E:
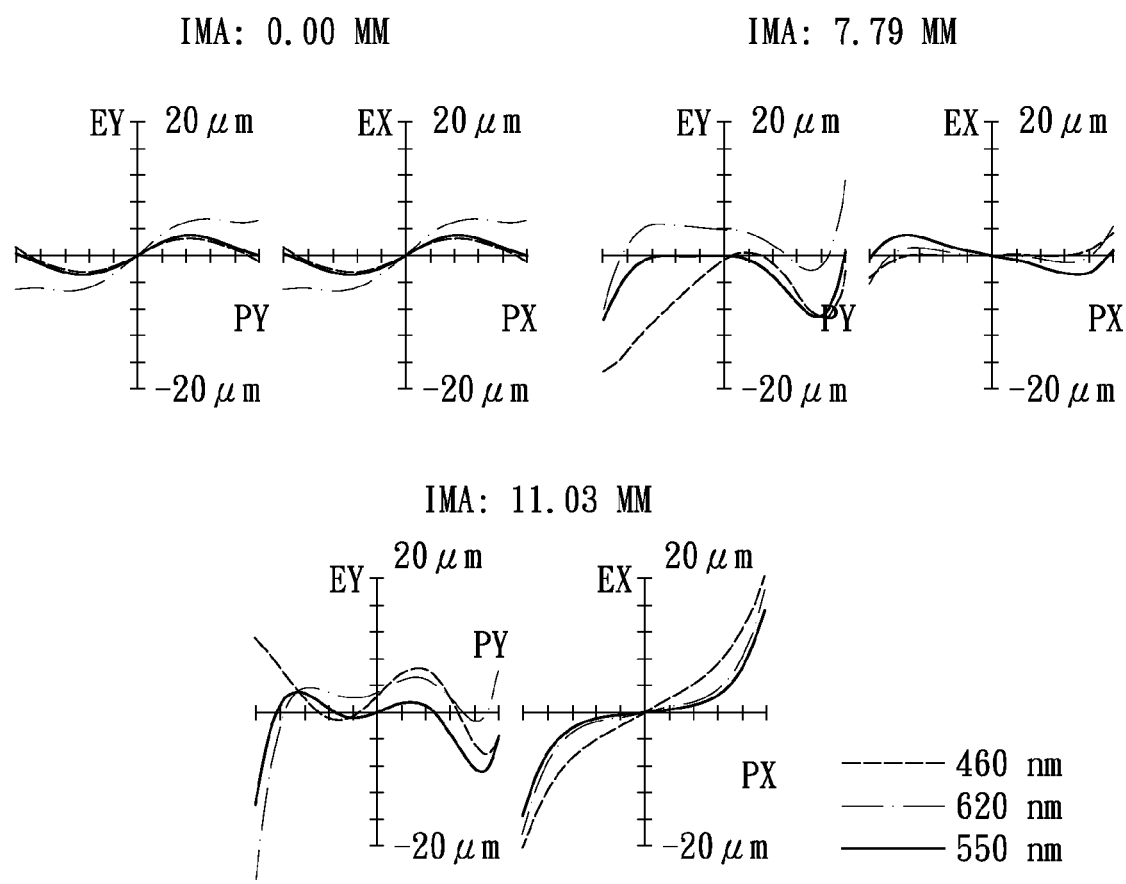
FIG. 6E is a transverse ray fan plot of the projection lens of the fifth embodiment.

FIG. 6A shows a MTF of the projection lens of the fifth embodiment. FIG. 6B is a diagram of field curvature of the projection lens of the fifth embodiment. FIG. 6C is a diagram of distortion of the projection lens of the fifth embodiment. FIG. 6D is a diagram of lateral color of the projection lens of the fifth embodiment. FIG. 6E is a transverse ray fan plot of the projection lens of the fifth embodiment.

Since the graphs shown in FIGS. 6A to 6E are respectively within the standard ranges, they may prove that the projection lens 100 of the fifth embodiment not only has a wide viewing angle, but also has a compact size and a lower cost in a condition of maintaining high imaging quality.

Sixth Embodiment

Detail data of the sixth embodiment will be shown in Table 11 and Table 12.

TABLE 11

| Surface number | Curvature radius (mm) | Interval (mm) | Refractive index | Abbe's number | Note |
|---|---|---|---|---|---|
| S1 | Infinity | 954.09 | | | Screen |
| S2 | 62.17 | 1.8 | 1.49 | 57.4 | L13 |
| S3 | 20.68 | Variable distance | | | |
| S4 | 93.46 | 1.8 | 1.8 | 46.6 | L1 |
| S5 | 21.76 | 21.7 | | | |
| S6 | −31.75 | 4.43 | 1.62 | 59.2 | L2 |
| S7 | 125.19 | Variable distance | | | |
| S8 | 317.31 | 10 | 1.81 | 39.3 | L3 |
| S9 | −45.73 | 17.41 | | | |
| S10 | 74.70 | 10 | 1.64 | 56.4 | L4 |
| S11 | 34.81 | 5.02 | | | |
| S12 | 150.08 | 9.89 | 1.65 | 31 | L5 |
| S13 | −31.28 | 1.81 | 1.84 | 26.8 | L6 |
| S14 | −112.73 | 0.19 | | | |
| S15 | 32.37 | 1.8 | 1.85 | 23.8 | L7 |
| S16 | 23.17 | 14.2 | 1.63 | 37.1 | L8 |
| S17 | −104.94 | 19.45 | | | |
| S18 | 51.95 | 1.8 | 1.82 | 36.2 | L9 |
| S19 | 11.65 | 5.74 | 1.5 | 78.6 | L10 |
| S20 | −12.78 | 1.81 | 1.8 | 46.6 | L11 |
| S21 | −27.24 | 4.88 | | | |
| S22 | 234.23 | 8.8 | 1.5 | 78.4 | L12 |
| S23 | −19.35 | 21.48 | | | |
| S24 | Infinity | 1.05 | 1.51 | 63.1 | Protection glass |
| S25 | Infinity | 1.1 | | | |

In Table 11, the interval of the surface S3 is a variable distance, wherein the longest distance of the interval of the surface S3 is 31.34 mm and the shortest distance of the interval of the surface S3 is 29.3 mm. The interval of the surface S7 is a variable distance, wherein the longest distance of the interval of the surface S7 is 2.51 mm and the shortest distance of the interval of the surface S7 is 2.32 mm. Furthermore, a focal length of the projection lens 100 of the sixth embodiment ranges between 6.87 mm and 7 mm. An F-number of the projection lens 100 of the sixth embodiment is about 2.67. The viewing angle (2ω) of the projection lens 100 of the sixth embodiment ranges between 112.1 degrees and 116.04 degrees. F3/F is about 140. Moreover, the surfaces S2 and S3 are two aspheric surfaces of the aspheric lens L13, and detail data of the surfaces S2 and S3 will be shown in Table 12.

TABLE 12

|  | Surface S2 | Surface S3 |
|---|---|---|
| k | −5.227499478 | −0.821899826 |
| $C_2$ | 0 | 0 |
| $C_4$ | 1.49943E−06 | 3.97626E−06 |
| $C_6$ | −1.29087E−09 | −1.04055E−08 |
| $C_8$ | 9.38851E−13 | 3.63921E−12 |
| $C_{10}$ | −2.94658E−16 | −7.1878E−16 |
| $C_{12}$ | 3.98092E−20 | 1.71352E−20 |

Figure 7A:
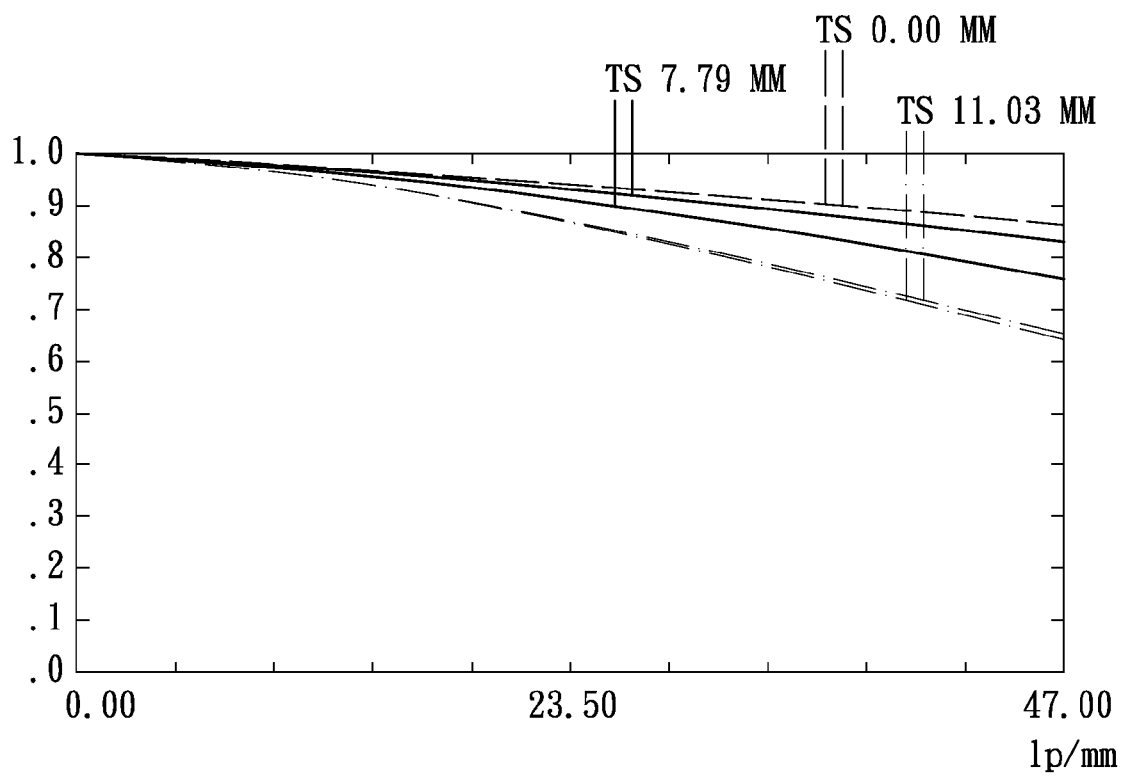
FIG. 7A shows a MTF of the projection lens of the sixth embodiment.
Figure 7B:
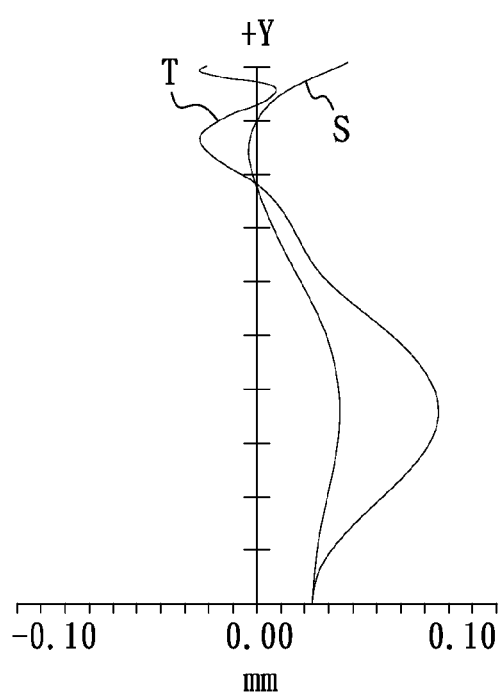
FIG. 7B is a diagram of field curvature of the projection lens of the sixth embodiment.
Figure 7C:
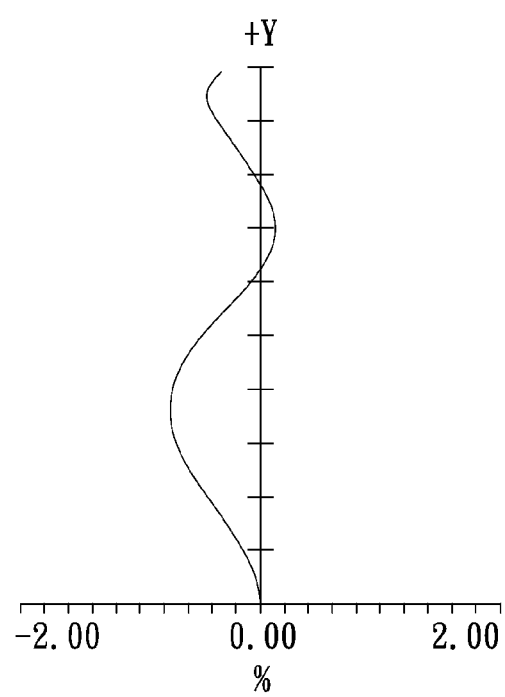
FIG. 7C is a diagram of distortion of the projection lens of the sixth embodiment.
Figure 7D:
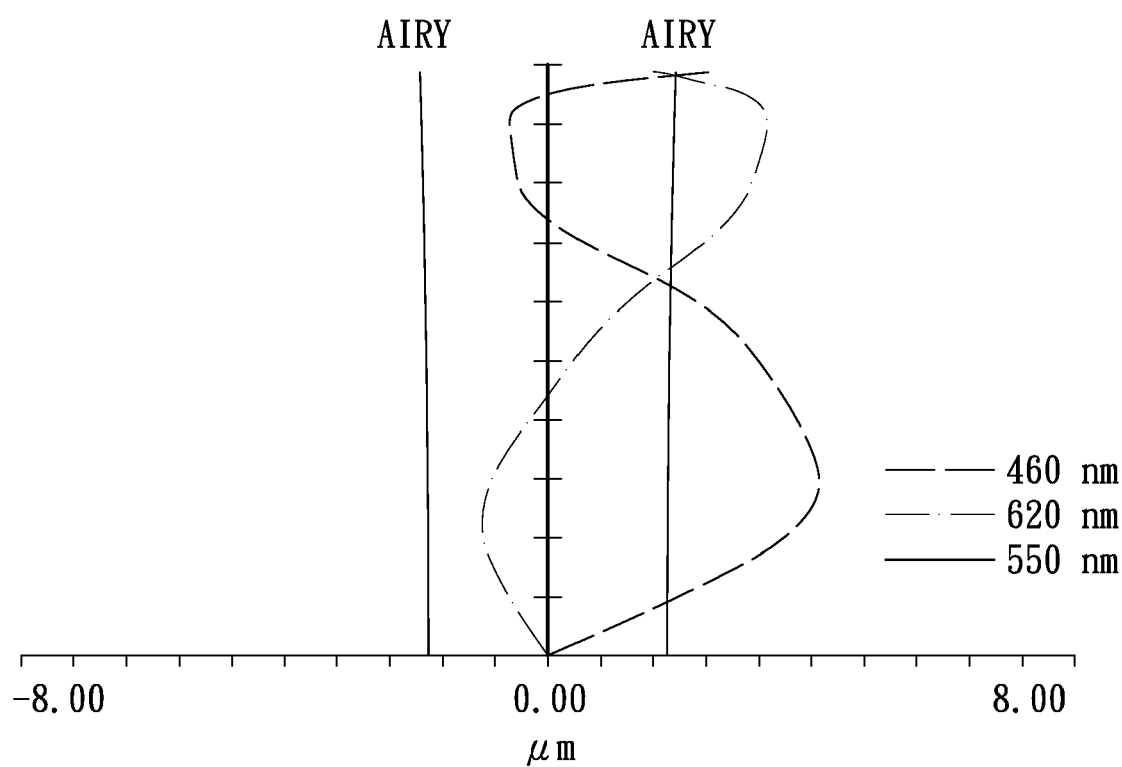
FIG. 7D is a diagram of lateral color of the projection lens of the sixth embodiment.
Figure 7E:
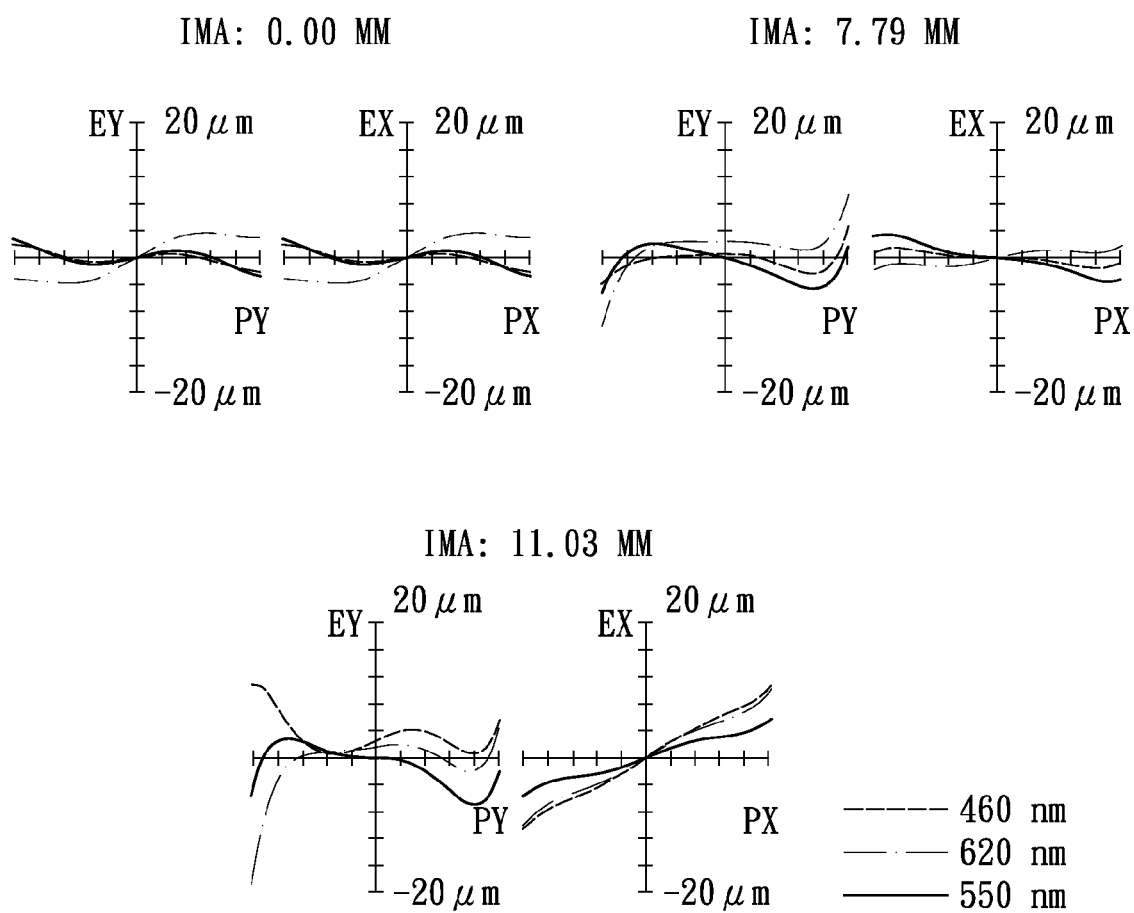
FIG. 7E is a transverse ray fan plot of the projection lens of the sixth embodiment.

FIG. 7A shows a MTF of the projection lens of the sixth embodiment. FIG. 7B is a diagram of field curvature of the projection lens of the sixth embodiment. FIG. 7C is a diagram of distortion of the projection lens of the sixth embodiment. FIG. 7D is a diagram of lateral color of the projection lens of the sixth embodiment. FIG. 7E is a transverse ray fan plot of the projection lens of the sixth embodiment.

Since the graphs shown in FIGS. 7A to 7E are respectively within the standard ranges, they may prove that the projection lens 100 of the sixth embodiment not only has a wide viewing angle, but also has a compact size and a lower cost in a condition of maintaining high imaging quality.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in sequence to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection lens comprising: a first lens group comprising an aspheric lens with a negative refractive power; a second lens group comprising a first lens and a second lens, the first lens being disposed between the aspheric lens and the second lens, and refractive powers of the first lens and the second lens being negative; and a third lens group having a positive refractive power and comprising a third lens, a fourth lens, a fifth lens, a sixth lens, a seventh lens, an eighth lens, a ninth lens, a tenth lens, an eleventh lens, and a twelfth lens arranged in sequence, the third lens being disposed between the second lens and the fourth lens, and refractive powers of the third lens, the fourth lens, the fifth lens, the sixth lens, the seventh lens, the eighth lens, the ninth lens, the tenth lens, the eleventh lens, and the twelfth lens being positive, negative, positive, negative, negative, positive, negative, positive, negative, and positive, respectively.

2. The projection lens as claimed in claim 1, wherein the fifth lens and the sixth lens are combined to form a first compound lens, the seventh lens and the eighth lens are combined to form a second compound lens, and the ninth lens, the tenth lens, and the eleventh lens are combined to form a third compound lens.

3. The projection lens as claimed in claim 1, wherein the first lens group and the second lens group are movable.

4. The projection lens as claimed in claim 1, wherein the first lens is a convex-concave lens with a convex surface facing the first lens group, the second lens is a biconcave lens, the third lens is a biconvex lens, the fourth lens is a convex-concave lens with a convex surface facing the third lens, the fifth lens is a biconvex lens, the sixth lens is a convex-concave lens with a convex surface facing the seventh lens, the seventh lens is a convex-concave lens with a convex surface facing the sixth lens, the eighth lens is a concave-convex lens with a convex surface facing the seventh lens, the ninth lens is a convex-concave lens with a convex surface facing the eighth lens, the tenth lens is a biconvex lens, the eleventh lens is a convex-concave lens with a convex surface facing the twelfth lens, and the twelfth lens is a biconvex lens.

5. The projection lens as claimed in claim 1 further comprising an aperture stop disposed between the eleventh lens and the twelfth lens.

6. The projection lens as claimed in claim 1 further comprising an aperture stop disposed on a surface of the eleventh lens, and the surface of the eleventh lens facing the twelfth lens.

7. The projection lens as claimed in claim 1, wherein the first lens, the second lens, the third lens, the fourth lens, the fifth lens, the sixth lens, the seventh lens, the eighth lens, the ninth lens, the tenth lens, the eleventh lens, and the twelfth lens are spherical lenses.

8. The projection lens as claimed in claim 1, wherein a focal length of the projection lens is F, a focal length of the first lens group is F1, a focal length of the second lens group is F2, a focal length of the third lens group is F3, $9.5 \leq |F1/F| \leq 14.5$, $0.68 \leq |F2/F| \leq 9$, and $4 \leq |F3/F| \leq 140$.

* * * * *